United States Patent [19]
Baucom

[11] Patent Number: 5,101,710
[45] Date of Patent: Apr. 7, 1992

[54] CONTROL APPARATUS OR SYSTEM FOR PURGED AND PRESSURIZED ENCLOSURES FOR ELECTRICAL EQUIPMENT

[75] Inventor: Michael K. Baucom, La Marque, Tex.

[73] Assignee: Bebco Industries, Inc., La Marque, Tex.

[21] Appl. No.: 522,992

[22] Filed: May 14, 1990

[51] Int. Cl.⁵ .................... F24F 7/007; F24F 11/00
[52] U.S. Cl. .................... 454/238; 454/239; 454/359; 454/184
[58] Field of Search .................... 98/1, 1.5

[56] References Cited
U.S. PATENT DOCUMENTS

| | | | |
|---|---|---|---|
| 3,016,813 | 1/1962 | Frasier et al. | 98/1 |
| 3,210,547 | 10/1965 | Eliot | 98/1 X |
| 4,720,044 | 1/1988 | Stemwedel, Jr. | 98/1.5 X |

Primary Examiner—Harold Joyce
Attorney, Agent, or Firm—Neal J. Mosely

[57] ABSTRACT

A control apparatus or system for purged and pressurized electrical equipment provides rapid, controlled exchange of pressurizing or purging gas to an electrical enclosure. The control system or apparatus for NFPA Type Y and Type Z electrical equipment enclosures has a source of pressurizing gas, a rapid exchange pressure control filter/regulator, rapid exchange pressure gauge, vent control valve and a manual inlet valve providing for rapid exchange of purging gas to the electrical enclosure during start up, an enclosure control valve, enclosure pressure indicator, a venturi providing controlled leakage from the system, and a pressure loss control alarm or switch. Another embodiment of the control system or apparatus for NFPA Type X electrical equipment enclosures has a rapid exchange pressure control filter/regulator, rapid exchange pressure gauge, vent control valve and an automatic inlet valve providing for rapid exchange of purging gas to the electrical enclosure during start up, and enclosure control valve, enclosure pressure indicator, a venturi providing controlled leakage from the system, and a pressure loss control alarm or switch.

73 Claims, 10 Drawing Sheets

CONTROL APPARATUS OR SYSTEM FOR PURGED AND PRESSURIZED ENCLOSURES FOR ELECTRICAL EQUIPMENT

FIELD OF THE INVENTION

This invention relates generally to purged and/or pressurized electrical equipment and more particularly to control systems therefor providing a controlled pressurization, purging, and/or rapid exchange of protection gas to an electrical enclosure.

BACKGROUND OF THE INVENTION

Control apparatus for purged and pressurized electrical equipment has been developed for protection against explosions from electric sparks in an environment containing explosive vapors, gases or dusts.

A National Fire Protection Association standard, i.e., NFPA 496, outlines the requirements for purged and pressurized enclosures for electrical equipment. The standard defines types of hazardous locations and types of purging to mitigate or eliminate the hazard.

A Class 1, Division 1 location is one in which ignitable concentrations of flammable gases or vapors exist under normal operating conditions; or in which ignitable concentrations of such gases or vapors may exist frequently because of repair or maintenance operations or because of leakage; or in which breakdown or faulty operations of equipment or processes might release ignitable concentrations of flammable gases or vapors and might also cause simultaneous failure of electrical equipment.

A Class 1, Division 2 location is one in which volatile flammable liquids or flammable gases or vapors are handled, processed or used, but in which the liquids, vapors or gases will normally be confined within closed containers or closed systems from which they can escape only in case of accidental rupture or breakdown of such containers or systems or in the case of abnormal operation of equipment; or in which ignitable concentrations of gases or vapors are normally prevented by positive mechanical ventilation and which might become hazardous through failure or abnormal operation of the ventilating equipment; or that it adjacent to a Class 1, Division 1 location and to which ignitable concentrations of gases or vapors might occasionally be communicated unless such communication is prevented by adequate positive pressure ventilation from a source of clean air and effective safeguards against ventilation failure are provided. Electrical conduits and their associated enclosures separated from process fluids by a single seal or barrier shall be classified as a Division 2 location if the outside of the conduit and enclosures is a nonhazardous location.

A Class 2, Division 1 location is one (1) in which combustible dust is in the air under normal operating conditions in quantities sufficient to, produce explosive or ignitable mixtures; or (2) where mechanical failure or abnormal operation of machinery or equipment might cause such explosive or ignitable mixtures to be produced and might also provide a source of ignition through simultaneous failure of electrical equipment, operation of protection devices or from other causes: or (3) in which combustible dusts of in electrically conductive nature may be present.

A Class 2, Division 2 location is one (1) in which combustible dust will not normally be in suspension in the air in quantities sufficient to produce explosive or ignitable mixtures and dust accumulations are normally insufficient to interfere with normal operation of electrical equipment of other apparatus; or (2) in which dust may be in suspension in the air as a result of infrequent malfunctioning of handling or processing equipment and dust accumulations resulting therefrom may be ignitable by abnormal operation or failure of electrical equipment or other apparatus.

Under these standards, the following definitions apply. Pressurization is the process of supplying an enclosure with clean air or an inert gas with or without continuous flow at sufficient pressure to prevent the entrance of combustible dusts and refers to Class 2 applications. Purging refers to Class 1 applications and is the process of supplying an enclosure with clean air or an inert gas at sufficient flow and positive pressure to reduce to an acceptably safe level the concentration of any flammable gas or vapor initially present and to maintain this safe level by positive pressure with or without continuous flow. Type X purging reduces the classification within an enclosure from Division 1 to nonhazardous. Type Y purging reduces the classification within an enclosure from Division 1 to Division 2. Type Z purging reduces the classification within an enclosure from Division 2 to nonhazardous.

The following U.S. Pat. Nos. are representative of pressurization and purging systems previously disclosed for use with various types of electrical equipment;

Williamson U.S. Pat. No. 2,449,436 discloses a system for pressurizing an apparatus containing volatile liquids with carbon dioxide and condensing the vapor from the pressurizing gas.

Bernard et al U.S. Pat. No. 2,467,181 discloses a system for pressurizing and purging an electric meter Thayer et al U.S. Pat. No. 2,807,755 discloses a system for pressurizing an electric switch box.

Pomon U.S. Pat. No. 2,816,678 discloses a system for pressurizing an electric panel board to render it explosion-proof.

Kleinpeter U.S. Pat. No. 2,985,337 discloses a system for pressurizing an electric enclosure having porous plates covering the discharge openings from the enclosure.

Rickert et al U.S. Pat. No. 4,211,251 discloses an automatically controlled system for pressurizing an electrical apparatus to protect it from explosive gases or vapors.

Volker et al U.S. Pat. No. 4,537,043 discloses a system for pressurizing an electrical apparatus with nitrogen and carbon dioxide to protect it from explosive gases or vapors.

Hsieh U.S. Pat. No. 4,616,694 discloses a system for controlling a ventilating system to protect electronic equipment from explosive gases or vapors.

Williams U.S. Pat. No. 4,802,502 discloses an automatically controlled system for pressurizing an electrical apparatus to protect it from explosive gases or vapors.

SUMMARY OF THE INVENTION

It is therefore a general object of this invention to provide a control system or apparatus for pressurization or purging of an enclosure to meet NFPA Type Y and Type Z electrical equipment purging specifications.

Another object of the present invention is to provide a control system or apparatus for pressurization or purging of an enclosure to meet NFPA Type X electrical equipment purging specifications.

Another object of this invention is to provide a control system or apparatus for purging and rapid exchange during start up of and enclosure to meet NFPA Type Y and Type Z electrical equipment purging specifications.

Another object of this invention is to provide a control system or apparatus for purging and rapid exchange during start up of and enclosure to meet NFPA Type X electrical equipment purging specifications.

Another object of this invention is to provide a control system or apparatus for NFPA Type Y and Type Z electrical equipment enclosures having a vent control valve and a manual inlet valve providing for rapid exchange of purging gas to the electrical enclosure during start up.

Still another object of this invention to provide a control system or apparatus for NFPA Type X electrical equipment enclosures having a vent control valve and an automatic inlet valve providing for rapid exchange of purging gas to the electrical enclosure during start up.

Still another object of this invention to provide a control system or apparatus for rapid exchange during startup consisting primarily of a valve and a spark arresting element designed to open at low pressure for venting of rapid exchange purging gases from an electrical enclosure, and/or for the venting of over pressurization resulting regulator failure or operator error while preventing the escape of any sparks resulting from failure of electrical equipment to meet NFPA type X, Y and Z electrical equipment purging specifications, and further including a straight or right angle mounting hub and a rain-proof cap to mount and protect the valve and spark arresting element assembly.

Still another object of this invention is to provide a control system or apparatus for pressurization of an enclosure to meet NFPA Type Y and Type Z specifications having an indicator to measure enclosure pressure, a regulator for control of the purging gas to the electrical enclosure and a venturi providing constant flow past the enclosure indicator.

Yet another object of this invention is to provide a control system or apparatus for pressurization of an enclosure to meet NFPA Type Y and Type Z specifications having an indicator to measure enclosure pressure, a regulator for control of the purging gas to the electrical enclosure and a venturi providing constant flow past the enclosure indicator and a pressure loss switch for activation of audible or visual alarms.

Yet another object of this invention is to provide a control system or apparatus for pressurization of an enclosure to meet NFPA Type Y and Type Z specifications having an indicator to measure enclosure pressure, a filter/regulator to preset the rapid exchange pressure and flow rate of the purging gas to the electrical enclosure, a rapid exchange pressure gauge, an enclosure pressure valve for adjustment of the enclosed pressure, a rapid exchange control valve for rapid exchange of purging gas to the electrical enclosure during start-up and a venturi providing constant flow past the enclosure indicator.

Yet another object of this invention is to provide a control system or apparatus for pressurization of an enclosure to meet NFPA Type Y and Type Z specifications having an indicator to measure enclosure pressure, a filter/regulator to preset the rapid exchange pressure and flow rate of the purging gas to the electrical enclosure, a rapid exchange pressure gauge, an enclosure pressure valve for adjustment of the enclosed pressure, a rapid exchange control valve for rapid exchange of purging gas to the electrical enclosure during start-up and a venturi providing constant flow past the enclosure indicator and a pressure loss switch for activation of audible or visual alarms.

Yet another object of this invention is to provide a control system or apparatus for pressurization of an enclosure to meet NFPA Type X specifications having an indicator to measure enclosure pressure, a regulator to control flow rate of the purging gas to the electrical enclosure and a venturi providing constant flow past the enclosure indicator and an electronic power control unit for control of power to the enclosure.

A further object of this invention is to provide a control system or apparatus for purging and rapid exchange of an enclosure to meet NFPA Type X specifications having an indicator to measure enclosure pressure, a filter/regulator to preset the rapid exchange pressure and flow rate of the purging gas to the electrical enclosure, a rapid exchange pressure gauge, an enclosure pressure valve for adjustment of the enclosed pressure, a manual rapid exchange control valve for rapid exchange of purging gas to the electrical enclosure during start-up and a venturi providing constant flow past the enclosure indicator and an electronic power control unit for control of power to the enclosure.

A further object of this invention is to provide a control system or apparatus for purging and rapid exchange of an enclosure to meet NFPA Type X specifications having an indicator to measure enclosure pressure, a filter/regulator to preset the rapid exchange pressure and flow rate of the purging gas to the electrical enclosure, a rapid exchange pressure gauge, an enclosure pressure valve for adjustment of the enclosed pressure, a semi-automatic rapid exchange control valve for rapid exchange of purging gas to the electrical enclosure during start-up, a venturi providing constant flow past the enclosure indicator and an electronic power control unit for control of power to the enclosure.

A further object of this invention is to provide a control system or apparatus for purging and rapid exchange of an enclosure to meet NFPA Type X specifications having an indicator to measure enclosure pressure, a filter/regulator to preset the rapid exchange pressure and flow rate of the purging gas to the electrical enclosure, a rapid exchange pressure gauge, an enclosure pressure valve for adjustment of the enclosed pressure, an automatic rapid exchange control valve for rapid exchange of purging gas to the electrical enclosure during start-up, a venturi providing constant flow past the enclosure indicator and an electronic power control unit for control of power to the enclosure.

Other objects of the invention will become apparent from time to time throughout the specification and claims as hereinafter related.

BRIEF DESCRIPTION OF THE DRAWINGS

FIG. 15 is an exploded view of one of the spark arresting vents used in the control apparatus and system comprising this invention.

DESCRIPTION OF THE PREFERRED EMBODIMENTS

The preferred embodiments of this invention control purging of Type X, Y, and Z systems. According to NFPA standards, a Class 1, Division 1 location is one in which ignitable concentrations of flammable gases or vapors exist under normal operating conditions; or in which ignitable concentrations of such gases or vapors may exist frequently because of repair or maintenance operations or because of leakage; or in which breakdown or faulty operations of equipment or processes might release ignitable concentrations of flammable gases or vapors and might also cause simultaneous failure of electrical equipment. A Class 1, Division 2 location is one in which volatile flammable liquids or flammable gases or vapors are handled, processed or used, but in which the liquids, vapors or gases will normally be confined within closed containers or closed systems from which they can escape only in case of accidental rupture or breakdown of such containers or systems or in the case of abnormal operation of equipment; or in which ignitable concentrations of gases or vapors are normally prevented by positive mechanical ventilation and which might become hazardous through failure or abnormal operation of the ventilating equipment; or that it adjacent to a Class 1, Division 1 location and to which ignitable concentrations of gases or vapors might occasionally be communicated unless such communication is prevented by adequate positive pressure ventilation from a source of clean air and effective safeguards against ventilation failure are provided. Electrical conduits and their associated enclosures separated from process fluids by a single seal or barrier shall be classified as a Division 2 location if the outside of the conduit and enclosures is a nonhazardous location.

In describing this invention, and its operation, the following definitions apply. Pressurization is the process of supplying an enclosure with clean air or an inert gas with or without continuous flow at sufficient pressure to prevent the entrance of combustible dusts. Purging is the process of supplying an enclosure with clean air or an inert gas at sufficient flow and positive pressure to reduce to an acceptably safe level the concentration of any flammable gas or vapor initially present and to maintain this safe level by positive pressure with or without continuous flow. Type X purging reduces the classification within an enclosure from Division 1 to nonhazardous. Type Y purging reduces the classification within an enclosure from Division 1 to Division 2. Type Z purging reduces the classification within an enclosure from Division 2 to nonhazardous. In the description of the preferred embodiments below, systems or apparatus are described for Type X, Y and Z purging.

DESCRIPTION OF ONE PREFERRED EMBODIMENT

Figure 1:
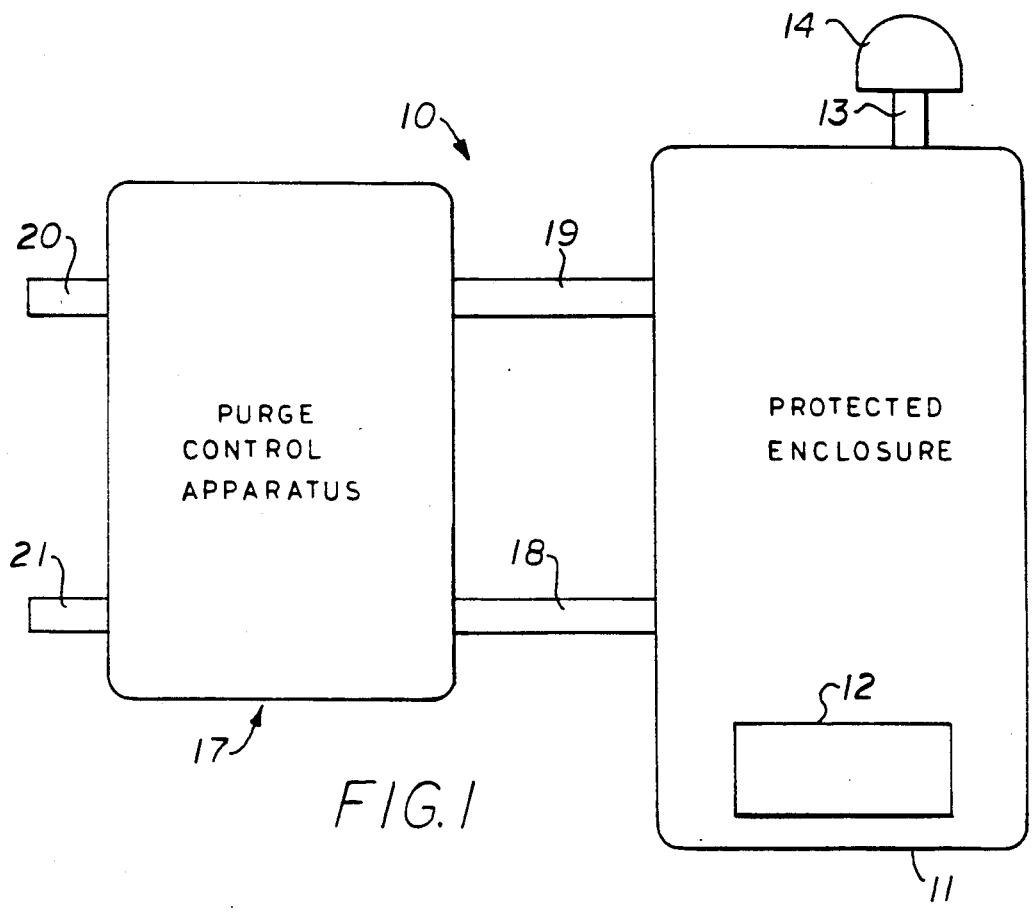
FIG. 1 is a schematic view of a continuous pressurization or purging system for electrical enclosures providing Type X pressurization or purging.
Figure 2:
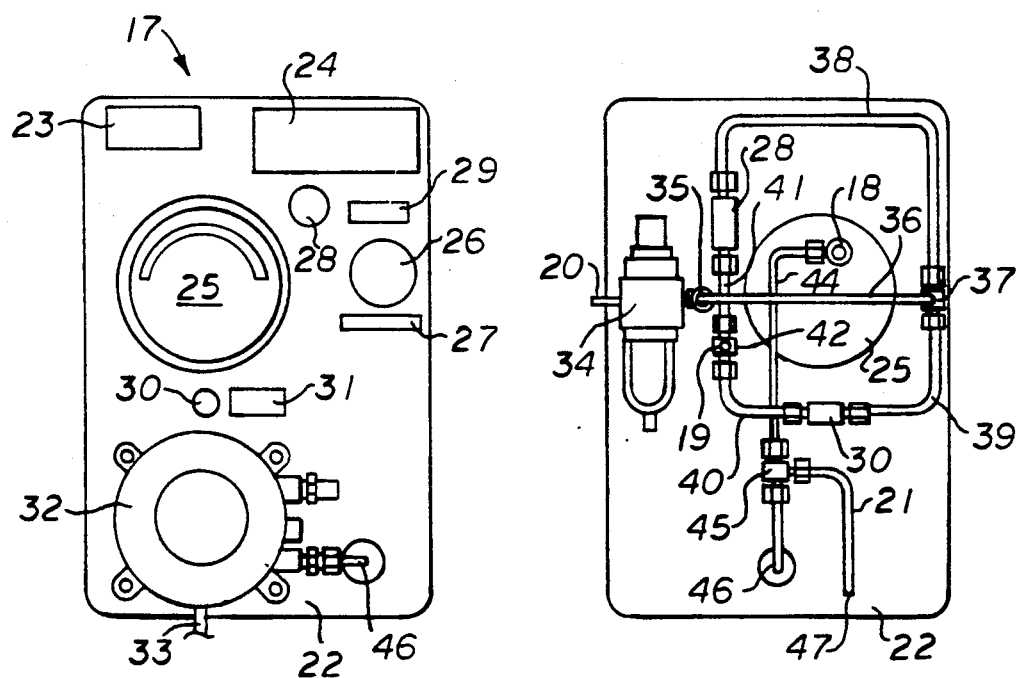
FIG. 2 is a front elevation of the control panel and apparatus thereon for Type Y or Type Z pressurization or purging in the system shown in FIG. 1.
Figure 3:
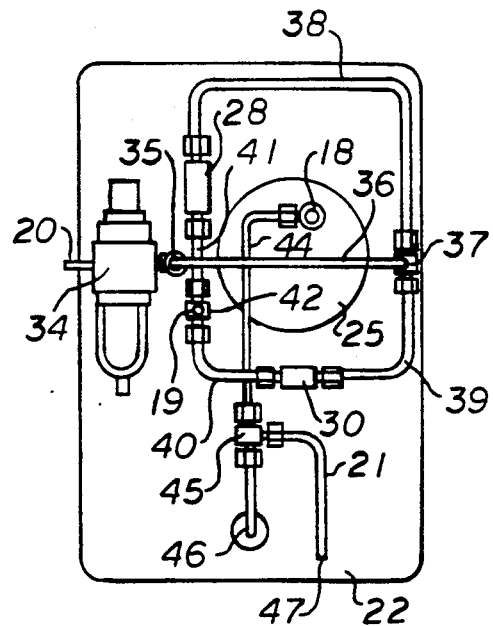
FIG. 3 is a rear elevation of the control panel shown in FIG. 2 showing the control components and piping.
Figure 4:
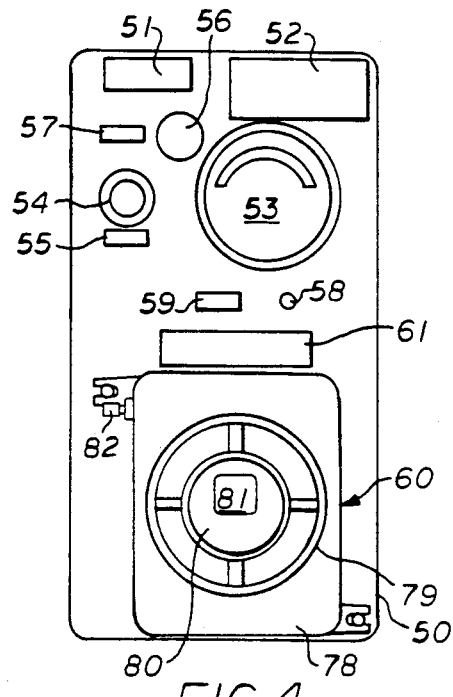
FIG. 4 is a front elevation of the control panel and apparatus thereon for Type X pressurization or purging in the system shown in FIG. 1.
Figure 5:
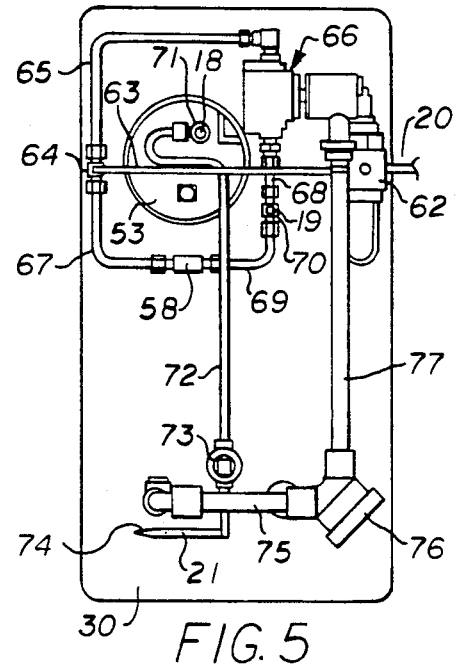
FIG. 5 is a rear elevation of the control panel shown in FIG. 4 showing the control components and piping.

Referring to the drawings by numerals of reference, there is shown in FIGS. 1-3 an enclosure control system or apparatus 10 for Type Y or Z purging. Protected enclosure 11 contains electrical apparatus (not shown) which is to be protected from flammable gases or vapors. Enclosure 11 has a name plate 12 advising that the enclosure is protected and not to be operated unless the control system 10 is in proper operation. At the top of enclosure 11, an exhaust or vent pipe 13 connected to enclosure protection vent 14.

Vent 14 is preferably a Bebco EPV series 1-5 vent valve assembly having a flap valve which opens at low pressure, as shown in FIG. 15. Vent 14 has a mounting hub lock ring 170 and hub O-ring 171 for connection to mounting hub 172. Base 175 has a threaded extension 173 for connection to mounting hub 172 with vent assembly fasteners 174 interposed. Metal flap valve 176 in pivoted at pivot 177 and opens on flow of air or gas through the valve assembly. Porous tubular screen 178 (which may be screen wire or a foraminous metal tube) screens the assembly against insects and protects against sparks. A cap plate 181 fits over the top of screen 178 and closes its top opening. A cup shaped cover 179 fits over the assembly and is held in place by cap bolts or screws 182. The materials of construction for vent 14 are mostly aluminum for minimum weight and the valve 176 will open at pressures below 1.0 in. H$_2$O, e.g. 0.5 in. and lower and up to about 2.0 in.

Control system 10 has a purge control apparatus 17 connected by tubes 18 and 19 to protected enclosure 11 and also has tubes 20 and 21 connected respectively to the source of purging gas and to exhaust via a venturi outlet. Purge control apparatus 17 comprises supporting panel 22 on which the various components are supported. At the top of panel 22 there is a name plate 23 identifying the type of control, and an instruction plate 24 setting forth the sequence of operation.

At the upper left, there is an enclosure pressure indicator gauge 25 with rapid exchange pressure gauge 26 and name plate 27 for the rapid exchange pressure gauge supported adjacent thereto. Enclosure pressure indicator gauge 25 is preferable a Dwyer series 2000 Magnahellic gauge designed for measuring air or gas pressure in the range from 0-1.0 in. of water (see U.S. Pat. Nos. 3,397,319; 3,862,416; 4,011,759; and 4,347,744). Rapid exchange pressure gauge is preferably a NOSHOK gauge measuring inlet pressures up to 100 p.s.i. or more. The handle for rapid exchange pressure valve 28 and its name plate 29 are positioned just above rapid exchange pressure gauge 26. The handle for enclosure pressure control valve 30 and its name plate 31 are positioned just below enclosure pressure indicator gauge 25. An explosion-proof pressure loss alarm switch 32 is located at the bottom of panel 22. The wiring 33 for alarm switch 32 is seen at the bottom of the switch. Alarm switch is preferably a Dwyer Series 1950 switch (see U.S. Pat. No. 3,566,060). The piping for the various valves and gauges is seen on the rear of the panel 22 shown in FIG. 3.

A combination filter/regulator 34, preferably a Watts B55 Integral Filter/Regulator, is mounted on the back of panel behind gauge 26 and is connected to the gauge to measure inlet pressure from the source of purge gas. Inlet line 20 from the source of purge gas is connected to an opening in the side of filter/regulator 34. The outlet from filter/regulator 34 is connected to an ell 35 which is connected by tubing 36 to tee 37. One side of tee 37 is connected by tubing 38 to the inlet side of rapid exchange pressure valve 28 and the other side is connected by tubing 39 to the inlet of enclosure pressure control valve 30. Valves 28 and 30 are therefore connected in parallel. Valve 28 is preferably a Parker ball valve and valve 30 a Parker needle valve.

The outlet from valve 30 is connected by tubing 40 and the outlet from valve 28 by tubing 41 to opposite sides of a tee 42. The tee 42 is connected to tubing 19 extending to protected enclosure 11. Return tubing 18 from protected enclosure 11 is connected to tee 43 connected in the back of gauge 25. The other side of tee 43 is connected by tubing 44 to one side of tee 45 which is connected by tubing 46 to alarm switch 32. The other side of tee 45 is connected to outlet tubing 21 having a crimped portion forming venturi outlet 47 for controlled leakage of purging gas from the system. Alarm switch is connected to an alarm and to an automatic shutdown relay (not shown) to give a signal and/or shut down the electrical equipment if there is a loss of enclosure protection system pressure.

OPERATION

The power to the protected enclosure 11 is initially off and the air supply (purging gas) to inlet line 20 is turned on. Before operating the system, the enclosure protection vent 14 and enclosure seal are carefully inspected. Enclosure protection control valve 30 and rapid exchange control valve are off. Filter/regulator 34 is set to maintain a selected inlet pressure, e.g., 50 psig. Enclosure protection control valve 30 is opened slowly until a safe pressure of 0.25 in. registers on gauge 25. This is the operating pressure for the system. Then the knob for rapid exchange control valve 28 is opened by counterclockwise rotation to apply the full inlet pressure, e.g., 50 psig., to the system for a selected time based on the size of the system. A rapid exchange time on small systems may be 1.0 min. per cubic foot while very large systems may be timed at 1.0 min. for two or three cubic feet.

While the rapid exchange valve 28 is open, there is a rapid flow of purging gas (compressed air) through enclosure 11 and out through enclosure protection vent 14. After the selected time, valve 28 is closed. The system will then drop in pressure to the 0.25 in. maintained by valve 30. After observing that the 0.25 in. pressure is being maintained, the power to the apparatus in the protected enclosure 11 may be turned on. Pressure loss requires immediate attention which is insured by operation of low pressure alarm switch 32 to operate the alarm and simultaneously deenergize the apparatus in the protected enclosure 11.

DESCRIPTION OF ANOTHER PREFERRED EMBODIMENT

Referring to the drawings by numerals of reference, there is shown in FIG. 1 and FIGS. 4-9 an enclosure control system or apparatus 10 for Type X purging. Protected enclosure 11 contains electrical apparatus (not shown) which is to be protected from flammable gases or vapors. Enclosure 11 has a name plate 12 advising that the enclosure is protected and not to be operated unless the control system 10 is in proper operation. At the top of enclosure 11, an exhaust or vent pipe 13 connected to enclosure protection vent 14. Vent 14 is preferably a Bebco EPV series 1-5 vent valve assembly having a flap valve which opens at low pressure.

Control system 10 has an automatic purge control apparatus 17 connected by tubes 18 and 19 to protected enclosure 11 and also has tubes 20 and 21 connected respectively to the source of purging gas and to exhaust. Purge control apparatus 17 comprises supporting panel 50 on which the various components are supported. At the top of panel 50 there is a name plate 51 identifying the type of control, and an instruction plate 52 setting forth the sequence of operation.

At the upper right, there is an enclosure pressure indicator gauge 53 with rapid exchange pressure gauge 54 and name plate 55 for the rapid exchange pressure gauge supported adjacent thereto. Enclosure pressure indicator gauge 53 is preferably a Dwyer series 2000 Magnahellic gauge designed for measuring air or gas pressure in the range from 0-1.0 in. of water (see U.S. Pat. Nos. 3,397,319; 3,862,416; 4,011,759; and 4,347,744). Rapid exchange pressure gauge 54 is preferably a NOSHOK gauge measuring inlet pressures up to 100 p.s.i. or more. The handle 56 for a rapid exchange pressure valve and its name plate 57 are positioned just above rapid exchange pressure gauge 54. The handle for enclosure pressure control valve 58 and its name plate 59 are positioned just below enclosure pressure indicator gauge 53. An explosion-proof electrical power control unit 60 is located at the bottom of panel 50. A LED start up status schedule 61 is located just above control unit 60. Details of control unit 60 are shown in FIGS. 6-9. The piping for the various valves and gauges is seen on the rear of the panel 50 shown in FIG. 5.

A combination filter/regulator 62, preferably a Watts B55 Integral Filter/Regulator, is mounted on the back of panel behind gauge 54 and is connected to the gauge to measure inlet pressure from the source of purge gas. Inlet line 20 from the source of purge gas is connected to an opening in the side of filter/regulator 62. The outlet from filter/regulator 62 is connected by tubing 63 to tee 64. One side of tee 64 is connected by tubing 63, to the inlet side of rapid exchange solenoid valve 66 and the other side is connected by tubing 67 to the inlet to enclosure pressure control valve 58. Valves 66 and 58 are therefore connected in parallel. Valve 66 is a solenoid valve handling pressures up to 6,000 psig. with a manual override by handle 56. Valve 58 is preferably a Parker needle valve.

The outlet from solenoid valve 66 is connected by tubing 68 and the outlet from valve 58 by tubing 69 to opposite sides of a tee 70. The tee 70 is connected to tubing 19 extending to protected enclosure 11. Return tubing 18 from protected enclosure 11 is connected to tee 71 connected in the back of gauge 53. The other side of tee 71 is connected by tubing 72 to flame arrestor 73 and to electric power control unit 60 and is vented through outlet tubing 21 having a crimped portion forming venturi outlet 74 for controlled leakage of purging gas from the system. Electric conduit 75 is connected to wire splice box 76 and by conduit 77 to connect the wiring for rapid exchange solenoid valve 66. Details of the electric power control unit 60 are shown in FIGS. 6-9 and described more fully below.

Figure 6:
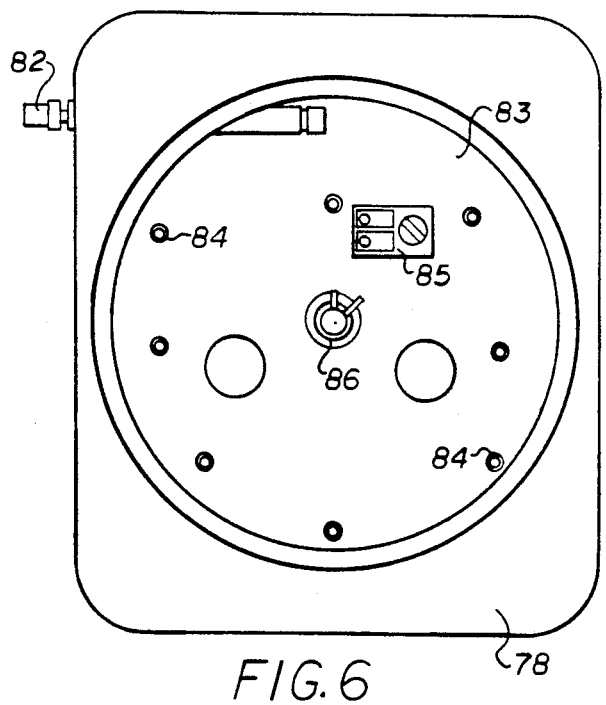
FIG. 6 is a view, in elevation, of the controller shown in FIG. 4 with the cover removed.

Electric power control unit 60 (FIGS. 4 and 6) comprises a housing 78 with removable front cover 79 having a transparent panel 80 through which there is seen an LED status indicator panel 81. A power mode selector switch 82 is located at the upper left of housing 78 for manual setting. In FIG. 6, the circuit panels, shown in FIGS. 7 and 8, and LED panel 81, shown in FIG. 9, have been removed to the level of the low alarm pressure switch and supports 84 for the circuit panels. A voltage regulator heat sink mounting base 85 is provided for connection to the voltage regulators on one of the circuit panels. Flame arrestor and switch tubing tee assembly 86 connects to the rear of housing 78. The circuit panels and LED panel are shown in FIGS. 6-9 and described below.

Circuit panel 87 (FIG. 7) is a power module mounted with 12 VDC voltage regulator 88 and 5 VDC voltage regulator 89 positioned against heat sink 85 (FIG. 6). Panel 87 has a 10 pt terminal block 90 providing the wiring connections for control unit 60 and a 2 pt terminal block 91 providing wiring connections to the rapid exchange solenoid valve 66. The panel is grounded through grounding lug 92 and the first terminal of terminal block 90. Terminals 2-10 of terminal block 90 are connected as follows: #2—control unit 120 VAC (neutral) input, #3 Control unit—it control unit 120 VAC (hot) input, #4—enclosure power input channel A, #5 enclosure power output channel A, #6—enclosure power input channel B, #7 enclosure power output channel B, #8 alarm switch normally open, #9 alarm switch common, #10 alarm switch normally closed. A power transformer 93 (120/220 VAC 50/60 Hz to 12 VDC) provides power for various circuits Panel 87 has a 1 amp input fuse 94 and two 20 amp output fuses 95 and 96. Diodes 97 provide relay back EMF protection. Diodes 98 are 12 VDC. power rectifiers. Diodes 99 are AC line transient protectors. Diode 100 is a reverse bias protector for voltage regulator 88 and diode 101 is a reverse bias protector for voltage regulator 89. Capacitor 102 provides unregulated 12 VDC power storage and capacitor 103 provides regulated 12 VDC power storage. Capacitor 104 is a 12 VDC high frequency decoupler for voltage regulator 88 and capacitor 105 is a 5 VDC high frequency decoupler for voltage regulator 89.

Figure 8:
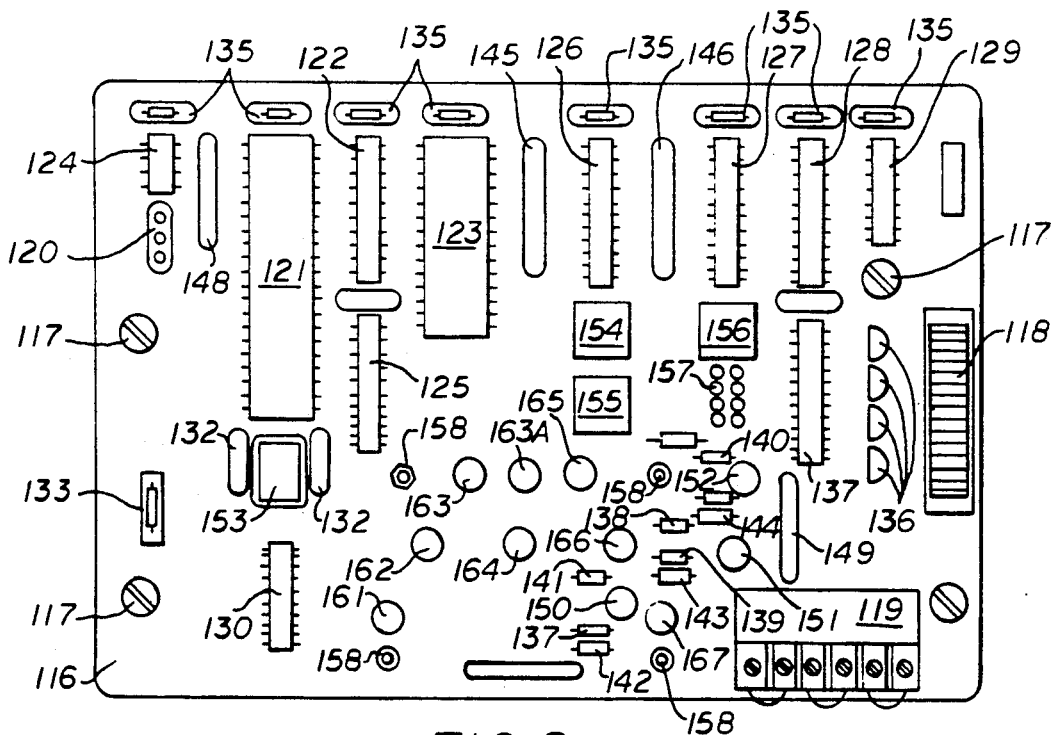
FIG. 8 is a view, in rear elevation, of the circuit board for the controller shown in FIG. 4.
Figure 10:
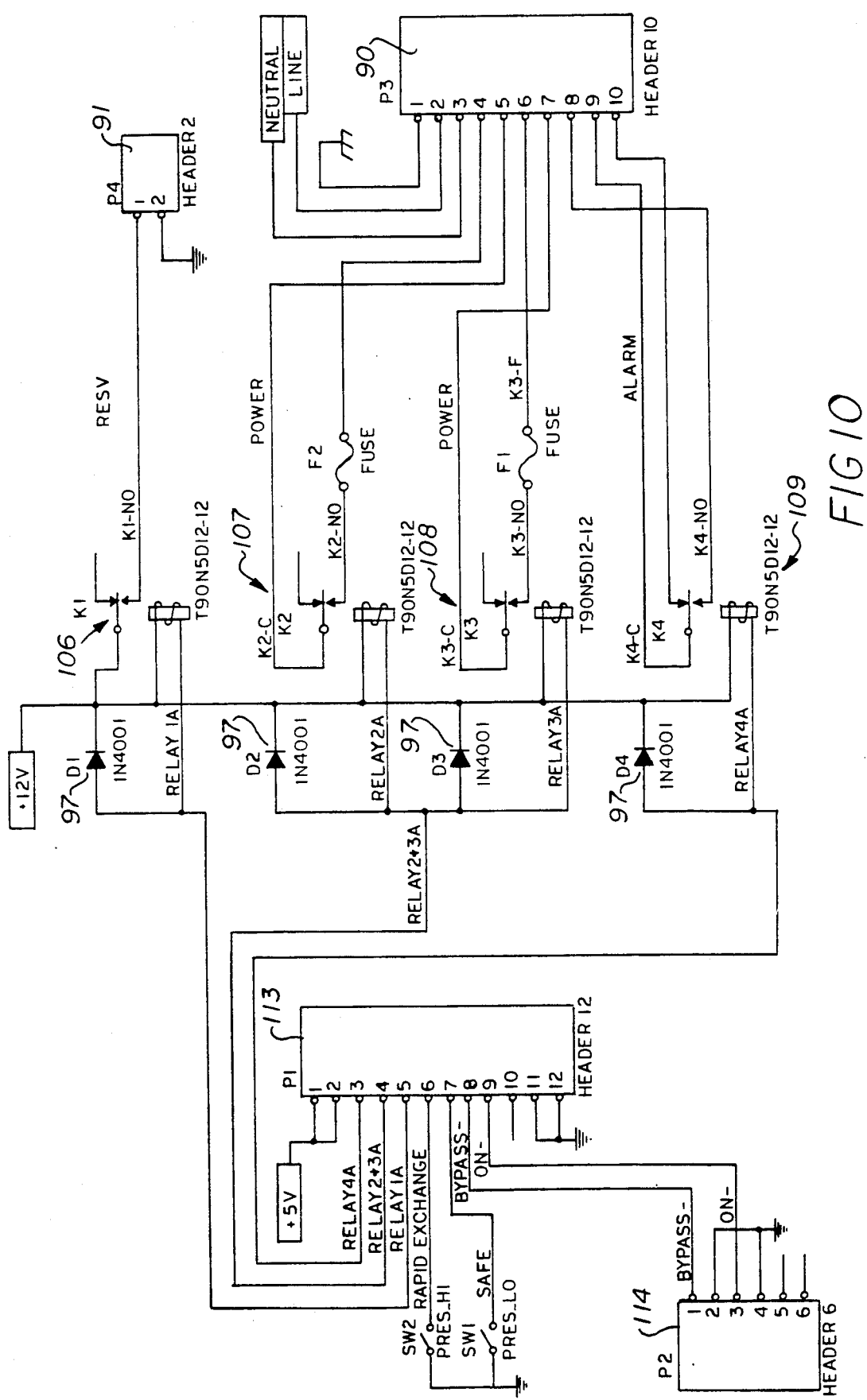
FIGS. 10-14 are wiring diagrams for the circuit boards shown in FIGS. 7 and 8.
Figure 11:
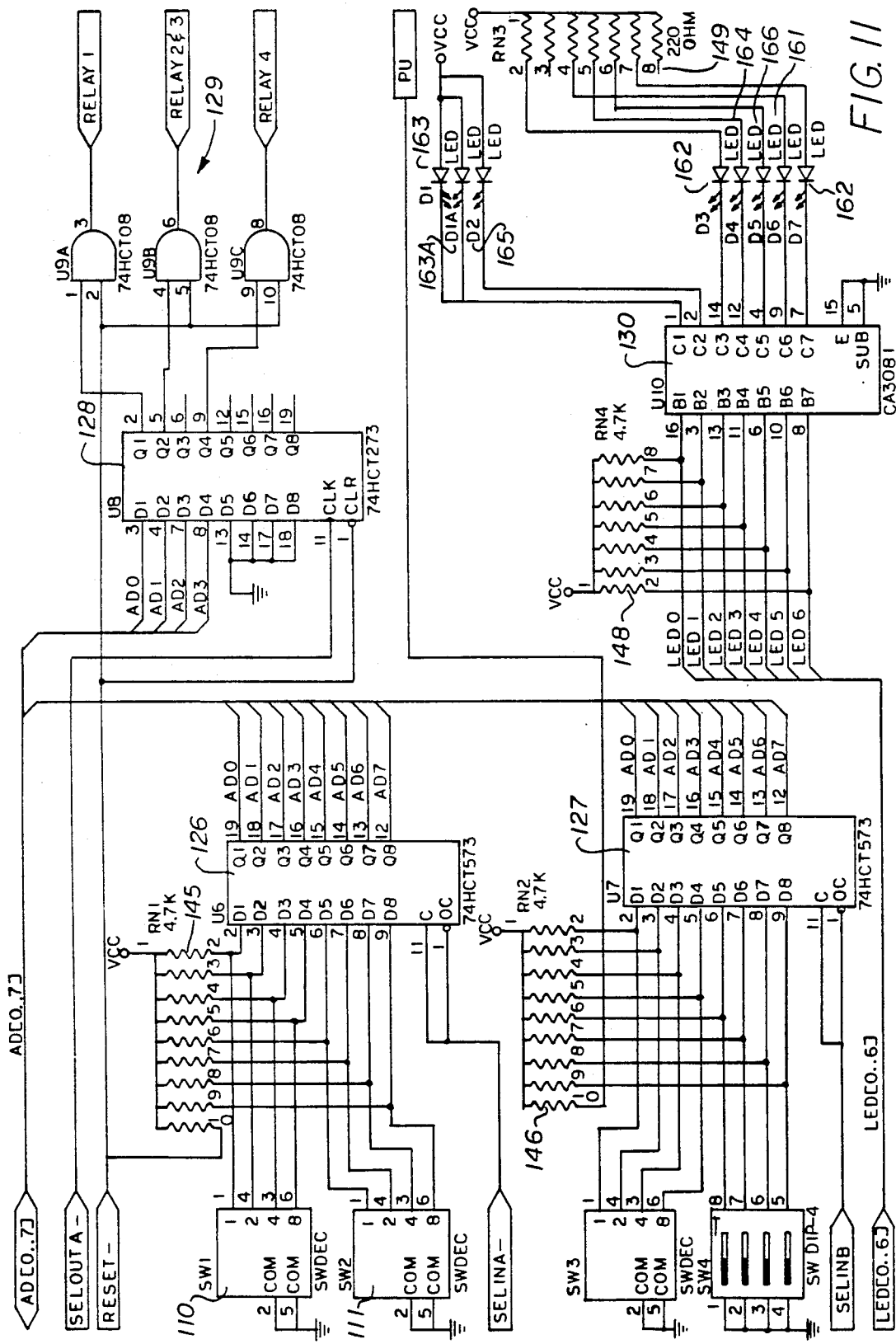
Figure 12:
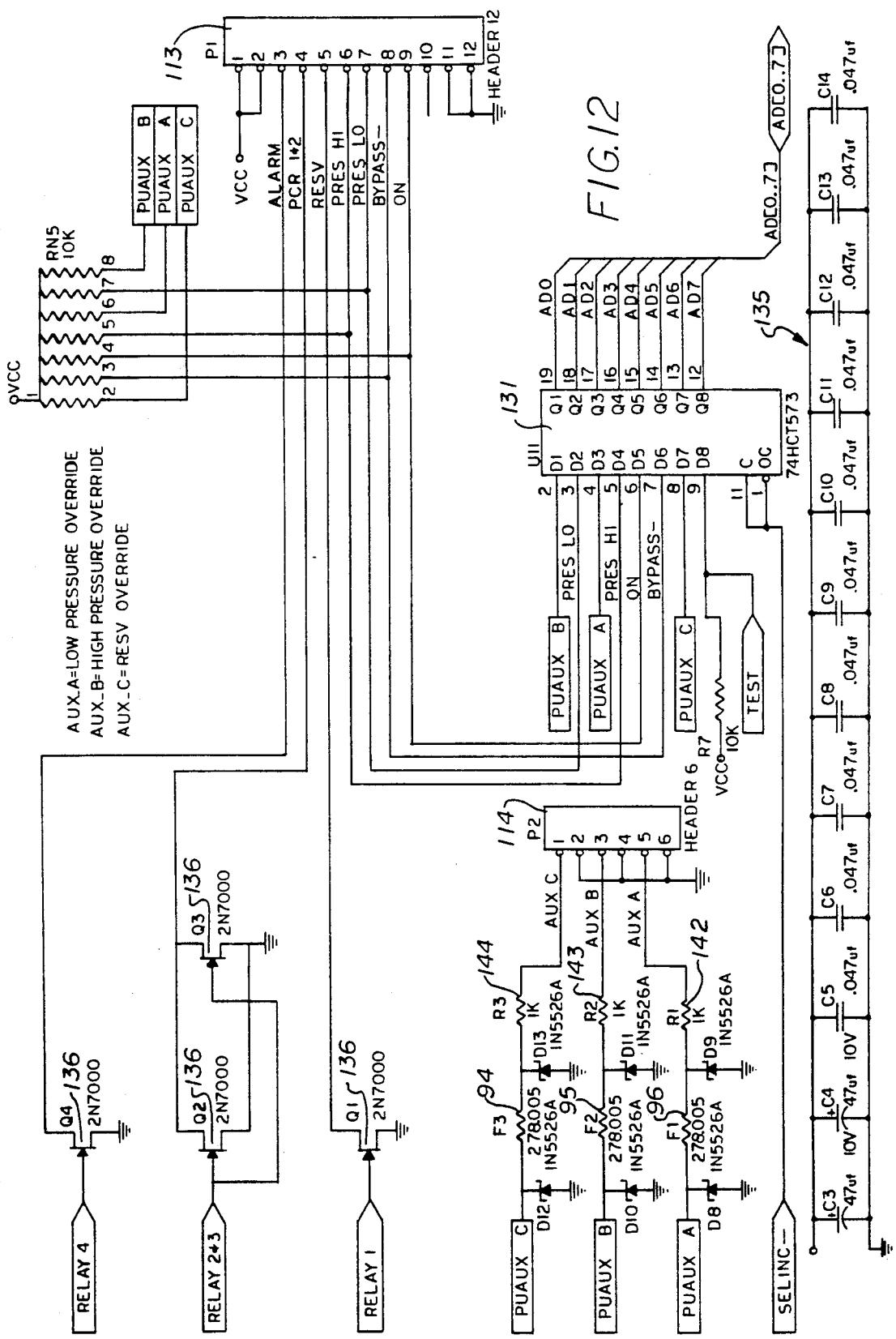
Figure 13:
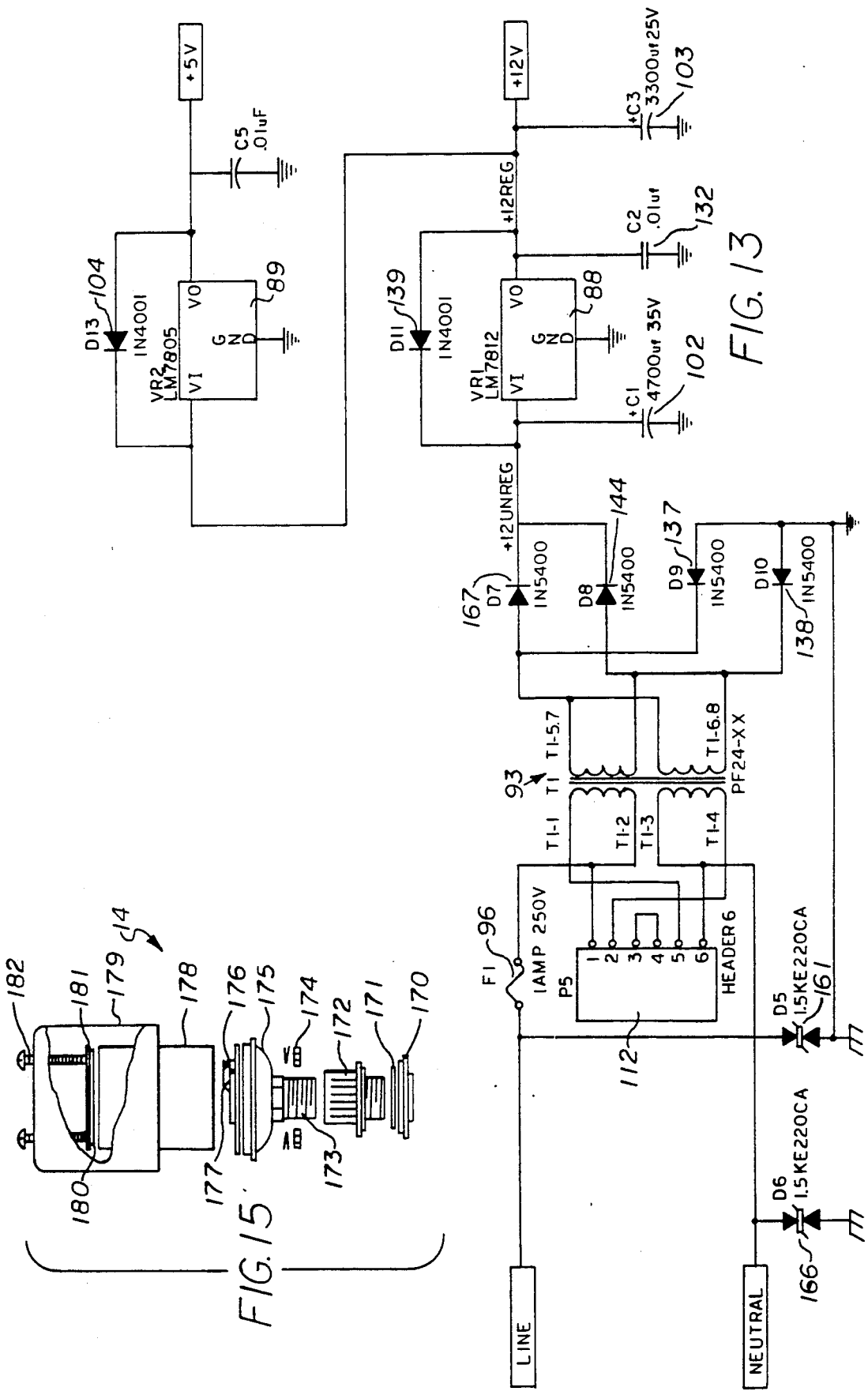
Figure 14:
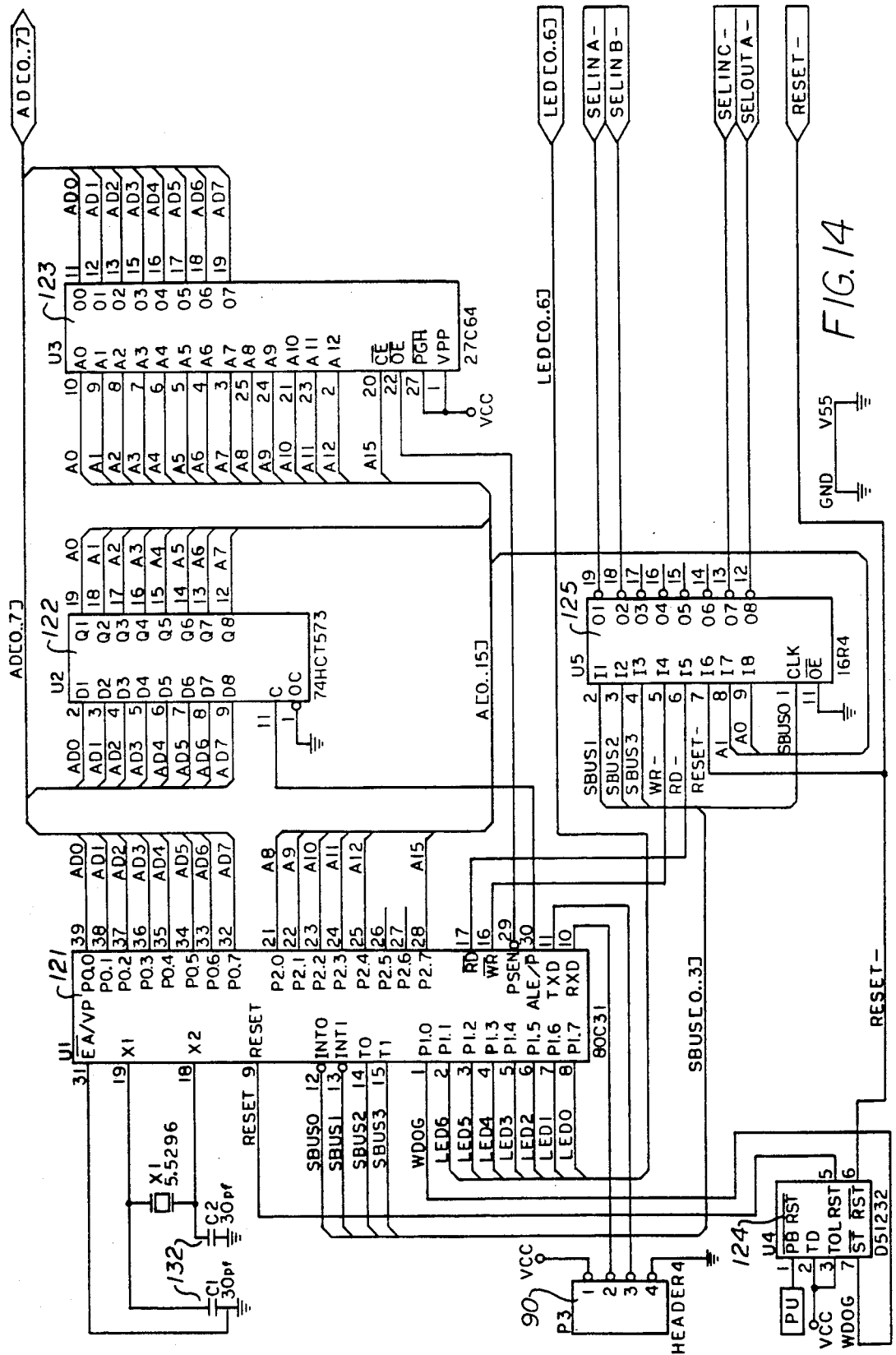

SPDT relay 106 controls solenoid valve 66. SPDT relays 107 and 108 control power to the control unit 60. SPDT relay 109 controls the purge gas pressure loss alarm Microswitch 110 is a pressure switch for operating at a safe pressure of 0.10–0.15 in. water. Microswitch 111 is a pressure switch for operating the solenoid valve 66 at pressure of 0.10–1.00 in. water. Pin connector 112 provides the socket for the voltage input selector. Pin connector 113 is the control unit board cable socket. Pin connector 114 is the socket for the power mode selector switch. Panel 87 has logic module mounting posts 115 positioned to support the logic module (FIG. 8).

Logic module panel 116 is mounted on mounting posts 115 above power module panel 87 by screws 117. Pin connector 118 is the socket for a connection cable interconnecting panels 87 and 116. A 6 pt terminal 119 provides connections to intrinsically safe auxiliary devices, e.g., limited access or gas detector switch, rapid excnange flow switch, or door or emergency stop switch. Connections on terminal 119 are jumpered when not in use. Pin terminal 120 is a serial test port.

A plurality of controllers provides various control functions. Microcontroller 12'. provides the control unit logic circuit. An 8 bit latch 122 is the microcontroller address latch. Eprom 123 provides control unit program storage. Watch dog timer 124 is a microcontroller reset controller. Latch controller 125 is an I/O decoder with lockout An 8 bit latch 126 is the timer input latch for the EDT and SLT timers. An 8 bit latch 127 is the timer input latch for the RET timer and mode selector switch input latch. An 8 bit latch 128 is the power relay output latch A quad AND gate 129 provides a power relay lockout. A transistor array 130 is the LED driver for the LED panel. An 8 bit latch 131 is an auxiliary input latch.

Capacitors 132 are oscillator bias protectors. Capacitors 133 and 134 are 5 VDC power filters Capacitors 135 are high frequency decouplers. FET transistors 136 are power transistors for relays 106–109. Diodes 137-141 are intrinsic safe barrier diodes. Resistors 142-144 are intrinsic safe barrier shunts. Resistor nets 145, 146 are pull-up resistors. Resistor net 147 provides LED current limiters. Resistor net 148 provides LED driver pull-ups Resistor net 149 provides intrinsic barrier latch pull-ups. Three 5 ma fuses 150-152 are intrinsic safe barrier fuses.

Figure 9:
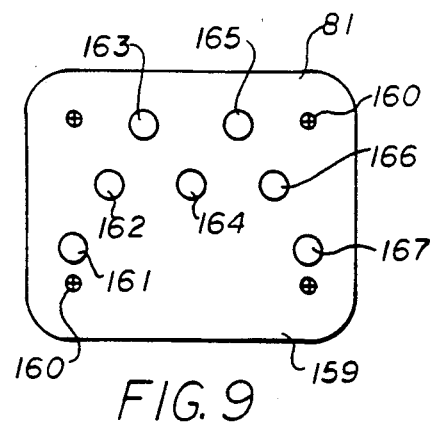
FIG. 9 is a detail view, in front elevation, of the LED digital read out panel for the controller shown in FIG. 4.
Figure 7:
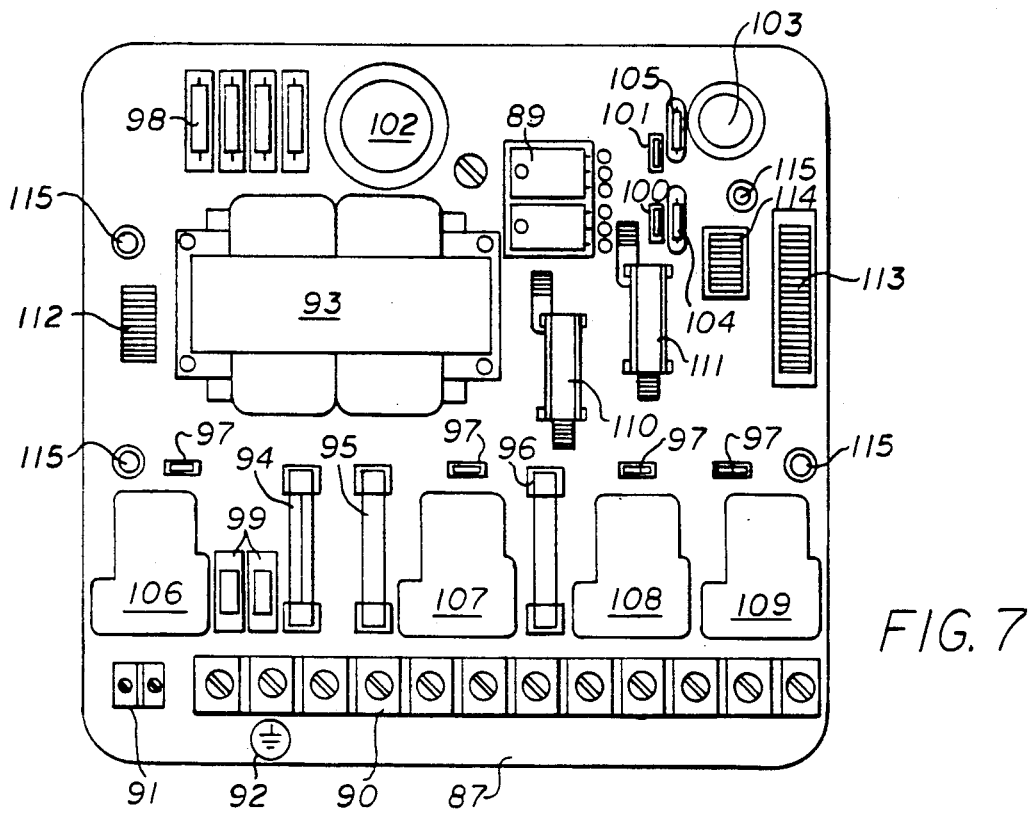
FIG. 7 is a view, in front elevation, of the circuit board for the controller shown in FIG. 4.

Timing functions are carried out by crystal 153, a microcontroller clock, and by a number of timing switches. EDT switch 154 is a rotary timer switch controlling rapid exchange delay timing SLT switch 155 is a rotary timer switch controlling solenoid latch timing. RET switch 156 is a rotary switch controlling rapid exchange timing. Pin sockets 157 receive a factory-set mode selector switch. Panel 116 has LED legend mounting ports 158 positioned to support the LED legend panel (FIG. 9).

LED legend panel 81 is mounted on mounting posts 158 above logic module panel 116 by screws 160. Panel 81 has a plurality of lenses aligned above the respective LEDs on panel 116 an carries legends (not shown) for the functions indicated by the various lights. LED 161 is a flashing red light (alarm) indicating safe pressure loss. LED 162 is a steady red light indicating enclosure power off. LED 163 (and LED 163a in an optional version) is a steady blue light indicating safe pressure detected. LED 164 is a steady yellow light indicating RET timer 156 running LED 165 is a steady blue light indicating that rapid exchange pressure is detected. LED 165 is a steady green light indicating enclosure power is on. LED 166 is a flashing green light indicating that power is by-passed, power latched.

OPERATION

The system requires a source of clean, instrument-quality, compressed air containing no more than trace amounts of flammable vapors or gases, and carefully regulated to a pressure in the range from 80 to 100 psi. If a compressor is utilized, it must have its intake in a nonhazardous area. Inert gas supply (compressed air must originate from a dedicated, instrument-quality, comp-essed air header (½" pipe or larger) no more than 20 feet from the protection system. The control unit 60 power source must originate from a circuit breaker or fused disconnect which is suitable for the hazardous area in which it is installed. Source should be uninterrupted and within 50 ft. of the protection system In setting up the system the following procedure is followed. First, ensure that the enclosed pressure control valve 58 is fully closed. Them connect the inert gas (compressed air) supply and set tne rapid exchange injection system to 60 psi. minimum by adjusting the filter/regulator 62. A test gauge or manometer is then connected to the enclosure 11 for measurement of 0-5 in. (water) pressure. Check the operation of enclosure protection vent valves 14 carefully. Open enclosure protection valve 58 slowly and set enclosure protection indicator 53 to a "safe" 0.25 in. Using manual override handle 56, open rapid exchange valve 66 to check that vent valves 14 open. Readjust regulator 62 to 60 psi. maximum while inducing rapid exchange flow through valve 66 until the test gauge reads 2-3 in. and does not fluctuate. Then close enclosure pressure control valve 58.

Examine the start-up instructions name plate and the LED panel name plate and follow instructions carefully. Set the RET timer dial 156 with a screwdriver to the specified setting, usually 1 minute per cubic foot of enclosure for a minimum time of five minutes. Set the dial to 0, each position of the dial adding five minutes Install and tighten cover of control unit 60. Turn mode selector switch 82 OFF and energize power to the unit 60. Power to alarm system is withheld during testing. Then, turn power mode switch 82 to ON which initiates the LED self test. Each LED should illuminate fully for two seconds, then all LEDs should turn off except power off steady red and alarm activated flashing red.

Turn control valve 58 slowly to set enclosed pressure indicator 53 to a "safe" 0.25 in. pressure. Check for a 0.10-0.15 in. trip point by slowly, adjusting the pressure in that range. The Safe Pressure LED 163 and EDT timer will turn on when the pressure reaches the trip point. Rapid exchange solenoid valve 66 will engage automatically after the set time out of timer operation. Immediately, recheck for satisfactory operation of enclosure vent valves 14. The Rapid Exchange and Timer Activated LEDs should be on and the SLT timer will be running. Check to trip point by turning control unit switch off and on. The Rapid Exchange and Timer Activated LEDs should not turn on until the valve is more than half open.

Starting again, allow the system to run through EDT, SLT and RET timer cycles and which for the solenoid valve 66 to deenergize. The valve should be able to shut off without disturbing the status of the Safe Pressure LED. Having ensured that the Safe Pressure and Rapid Exchange Pressure Switches and LED indicators are functioning properly, continue with the start-up procedure through a complete cycle, to ensure that the system function properly through all phases of operation. At the end of the set-up procedure, remove the test equipment and proceed with normal start-up of operations.

The start-up of the system used in the set-up procedure and in normal operation is as follows. First, check the operation of enclosure protection vent valves 14 carefully to ensure proper operation. Then, turn the power mode selector switch 82 to the ON position and witness the LED self test. Each LED should illuminate fully for two seconds, then all LEDs should turn off except power off steady red and alarm activated flashing red. Turn enclosure pressure control valve 58 slowly to set enclosed pressure indicator 53 to a "safe" 0.25 in. pressure Power Off LED and Safe Pressure LED and EDT time should turn on Rapid Exchange Solenoid Valve 66 will energize automatically when EDT Timer Cycle is completed. Then check again to see that vent valves 14 open properly.

Rapid Exchange and Timer Activated LEDs should now be on and the SLT Timer Cycle will begin. If the Safe Pressure or Rapid Exchange LEDs blink or flicker during this operation, the system will reset the RET Timer. When SLT Cycle is completed, the RET Timer will start. Standby during RET Timer Cycle until control unit 60 energizes power. Safe Pressure and Rapid Exchange LEDs should stay on. Timer activated LED should turn off and Power On LED should turn on. At the same time, the Rapid Exchange Valve 66 should deenergize and Rapid Exchange LED should turn off. Check that the Enclosure Pressure indicator 53 maintains a "safe" 0.25 in. pressure (readjusting if necessary) before leaving the system unattended.

A THIRD PREFERRED EMBODIMENT

Referring to the drawings by numerals of reference, there is shown in FIGS. 1-3 an enclosure control system or apparatus 10 for Type Z purging. Protected enclosure 11 contains electrical apparatus (not shown) which is to be protected from flammable gases or vapors. Enclosure 11 has a name plate 12 advising that the enclosure is protected and not to be operated unless the control system 10 is in proper operation. At the top of enclosure 11, an exhaust or vent pipe 13 connected to enclosure protection vent 14, preferably a Bebco EPV series 1-5 vent valve assembly having a flap valve which opens at low pressre, as shown in FIG. 15 and described above.

A purge control apparatus 200 (FIGS. 16 17) is substituted in the system shown in FIG. 1 and is connected respectively to the source of purging gas and to exhaust via a venturi outlet. Purge control apparatus 200 comprises supporting panel 201 on which the various components are supported. At the top of panel 201 there is a name plate 202 identifying the type of control. An instruction plate 204 sets forth the sequence of operation.

At the upper right, there is an enclosure pressure indicator gauge 207. Enclosure pressure indicator gauge 207 is preferable a Dwyer series 2000 Magnahellic gauge designed for measuring air or gas pressure in the range from 0-1.0 in. of water (see U.S. Pat. Nos. 3,397,319; 3,862,416; 4,011,759; and 4,347,744). The handle for enclosure pressure control valve 205 and its name plate 206 are positioned to the left of enclosure pressure indicator gauge 25.

A regulator 208 is mounted on the back of panel behind pressure valve 205. Inlet line 209 from the source of purge gas is connected to an opening in the top of regulator 208. The outlet from regulator 208 is connected to enclosure pressure supply 210. Return tubing 211 from the protected enclosure is connected to the back of gauge 207 and to outlet tubing having a crimped portion forming venturi outlet 212 for controlled leakage of purging gas from the system. The apparatus is like that shown in FIGS. 2, 3, but without the rapid/exchange valve, pressure alarm switch and filter/regulator.

OPERATION

The power to the protected enclosure is initially off and the air supply (purging gas) to the inlet line is turned on. Before operating the system, the enclosure protection vent 14 and enclosure seal are carefully inspected. Regulator 208 is set to maintain a safe pressure of 0.25" $H_2O$ by slowly opening enclosure protection control valve 205 until safe pressure registers on gauge 207. This is the operating pressure for the system. The system is maintained at the 0.25 in. by valve 207. After observing that the 0.25 in. pressure is being maintained, the power to the apparatus in the protected enclosure may be turned on.

A FOURTH PREFERRED EMBODIMENT

Referring to the drawings by numerals of reference, there is shown in FIGS. 1-3 an enclosure control system or apparatus 10 for Type Z purging. Protected enclosure 11 contains electrical apparatus (not shown) which is to be protected from flammable gases or vapors. Enclosure 11 has a name plate 12 advising that the enclosure is protected and not to be operated unless the control system 10 is in proper operation. At the top of enclosure 11, an exhaust or vent pipe 13 connected to enclosure protection vent 14, preferably a Bebco EPV series 1-5 vent valve assembly having a flap valve which opens at low pressure, as shown in FIG. 15 and described above.

Figure 16:
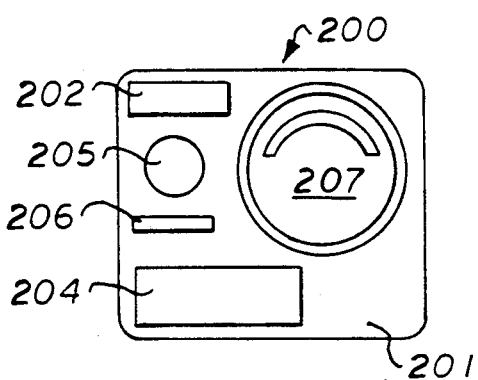
FIG. 16 is a front elevation of the control panel and apparatus thereon, without the pressure control switch or rapid exchange feature, for Type Z pressurization or purging.
Figure 17:
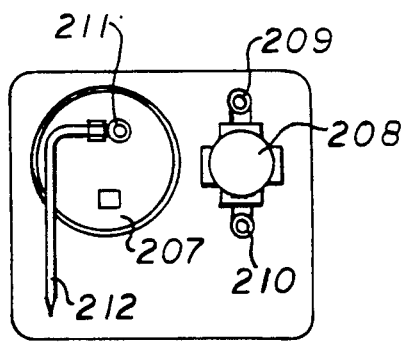
FIG. 17 is a rear elevation of the control panel shown in FIG. 16 showing the control components and piping.
Figure 18:
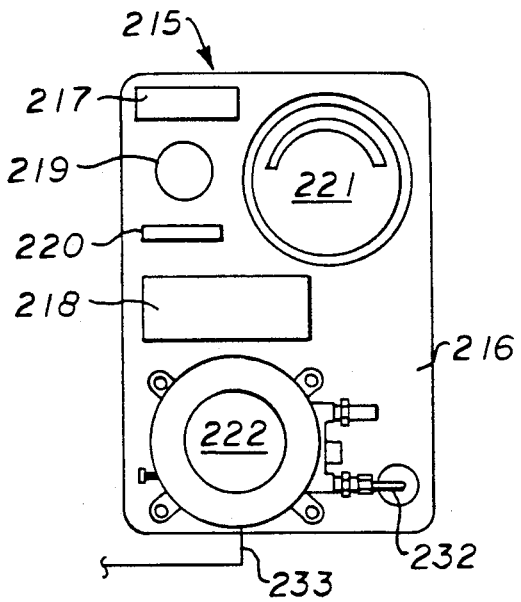
FIG. 18 is a front elevation of the control panel and apparatus thereon, substantially as in FIG. 16 with pressure control switch, for Type Z pressization or purging.
Figure 19:
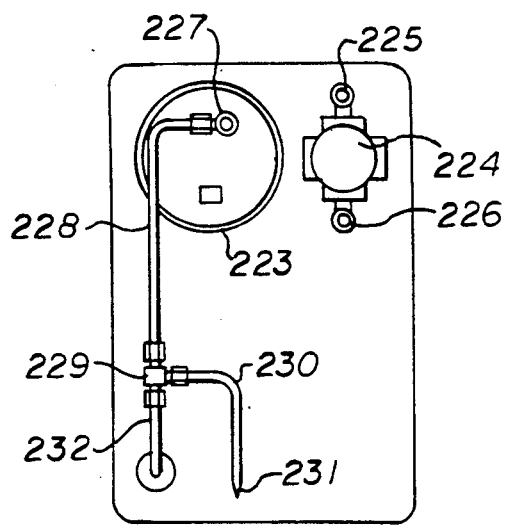
FIG. 19 is a rear elevation of the control panel shown in FIG. 18 showing the control components and piping.

A purge control apparatus 215 is substituted in the system shown in FIG. 1 and is substantially that shown in FIGS. 16 17 with the addition of a low pressure control or alarm valve. (FIGS. 18 & 19) Purge control apparatus 215 is connected respectively to the source of purging gas and to exhaust via a venturi outlet. Purge control apparatus 215 comprises supporting panel 216 on which the various components are supported. At the top of panel 216 there is a name plate 217 identifying the type of control. An instruction plate 218 sets forth the sequence of operation At the upper right, there is an enclosure pressure indicator gauge 221. Enclosure pressure indicator gauge 221 is preferably a Dwyer series 2000 Magnahellic gauge designed for measuring air or gas pressure in the range from 0-1.0 in. of water (see U.S. Pat. Nos. 3,397,319; 3,862,416; 4,011,759; and 4,347,744). The handle for enclosure pressure control valve 219 and its name plate 220 are positioned to the left of enclosure pressure indicator gauge 221. An explosion-proof pressure loss alarm switch 222 is located at the bottom of panel 216. The wiring 233 for alarm switch 222 is seen at the bottom of the switch. Alarm switch is preferably a Dwyer Series 1950 switch (see U.S. Pat. No. 3,566,060). The piping for the various valves and gauges is seen on the rear of the panel 216 shown in FIG. 19.

A regulator 224 is mounted on the back of panel behind pressure valve 219. Inlet line 225 from the source of purge gas is connected to an opening in the top of regulator 224. The outlet from regulator 224 is connected to enclosure pressure supply 226. Return tubing 227 from the protected enclosure is connected to the back of gauge 223 and to outlet tubing 228 leading to tee 229 with tubing 230 extending therefrom having a crimped portion forming venturi outlet 231 for controlled leakage of purging gas from the system. The other side of tee 229 is connected by tubing 232 to pressure loss alarm switch 222, as in FIGS. 2 & 3. Alarm switch is connected to an alarm and to an automatic shutdown relay (not shown) to give a signal and/or shut down the electrical equipment if there is a loss orenclosure protection system pressure.

OPERATION

The power to the protected enclosure is initially off and the air supply (purging gas) to the inlet line is turned on. Before operating the system, the enclosure protection vent 14 and enclosure seal are carefully inspected. Regulator 208 is set to maintain a safe pressure of 0.25"$H_2O$ by slowly opening enclosure protection control valve 205 until safe pressure registers on gauge 207. This is the operating pressure for the system. The system is maintained at the 0.25 in. by valve 205. After observing that the 0.25 in. pressure is being maintained, the power to the apparatus in the protected enclosure may be turned on. Pressure loss requires immediate attention which is insured by operation of low pressure alarm switch 222 to operate the alarm and/or simultaneously deenergize the apparatus in the protected enclosure 11.

DESCRIPTION OF A FIFTH PREFERRED EMBODIMENT

Figure 20:
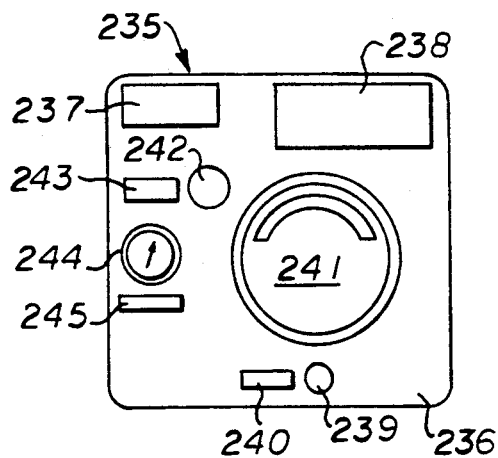
FIG. 20 is a front elevation of the control panel and apparatus thereon, substantially FIG. 2 without the pressure control switch, for Type Z pressurization or purging.
Figure 21:
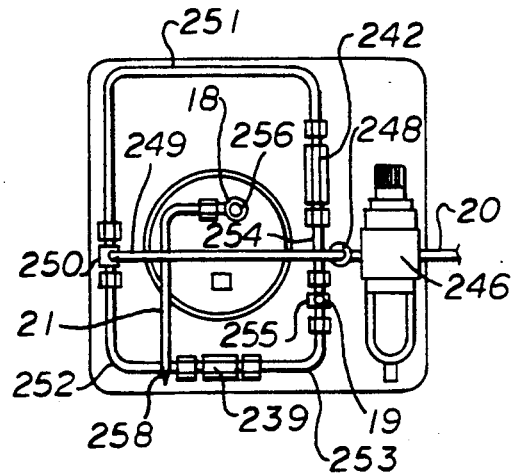
FIG. 21 is a rear elevation of the control panel shown in FIG. 20 showing the control components and piping

Referring to the drawings by numerals of reference, there is shown in FIGS. 1-3 an enclosure control system or apparatus 10 for Type Y or Z purging. Protected enclosure 11 contains electrical apparatus (not shown) which is to be protected from flammable gases or vapors. Enclosure 11 has a name plate 12 advising that the enclosure is protected and not to be operated unless the control system 10 is in proper operation. At the top of enclosure 11, an exhaust or vent pipe 13 connected to enclosure protection vent 14. Vent 14 is preferably a Bebco EPV series 1-5 vent valve assembly having a flap valve which opens at low pressure, as shown in FIG. 15 and described above Referring to FIGS. 20 21, a purge control apparatus 235 is substituted in the system shown in FIG. 1 and is connected respectively to the source of purging gas and to exhaust via a venturi outlet. Purge control apparatus 235 comprises supporting panel 236 on which the various components are supported. At the top of panel 236 there is a name plate 237 identifying the type of control An instruction plate 238 sets forth the sequence of operation.

Below instruction plate 238, there is an enclosure pressure indicator gauge 241 with rapid exchange pressure gauge 244 and name plate 245 for the rapid exchange pressure gauge supported adjacent thereto. Enclosure pressure indicator gauge 241 is preferable a Dwyer series 2000 Magnahellic gauge designed for measuring air or gas pressure in the range from 0–1.0 in. of water (see U.S. Pat. Nos. 3,397,319; 3,862,416; 4,011,759; and 4,347,744). Rapid exchange pressure gauge 244 is preferably a NOSHOK gauge measuring inlet pressures up to 100 p.s.i. or more.

The handle for rapid exchange pressure valve 242 and its name plate 243 are positioned just above rapid exchange pressure gauge 26. The handle for enclosure pressure control valve 239 and its name plate 240 are positioned just below enclosure pressure indicator gauge 241. The apparatus is essentially that of FIGS. 2 & 3 without the explosion-proof pressure loss alarm switch.

A combination filter/regulator 246, preferably a Watts B55 Integral Filter/Regulator, is mounted on the back of panel 236 behind gauge 244 and is connected to the gauge to measure inlet pressure from the source of purge gas. Inlet line 20 from the source of purge gas is connected to an opening in the side of filter/regulator 246. The outlet from filter/regulator 246 is connected to an ell 248 which is connected by tubing 249 to tee 250. One side of tee 250 is connected by tubing 251 to the inlet side of rapid exchange pressure valve 242 and the other side is connected by tubing 252 to the inlet of enclosure pressure control valve 239. Valves 239 and 242 are therefore connected in parallel.

The outlet from valve 239 is connected by tubing 253 and the outlet from valve 242 by tubing 254 to opposite sides of a tee 255. The tee 255 is connected to tubing 19 extending to protected enclosure 11. Return tubing 18 from protected enclosure 11 is connected to tee 256 connected in the back of gauge 241. The other side of tee 256 is connected by tubing 21 a crimped portion forming venturi outlet 258 for controlled leakage of purging gas from the system.

OPERATION

The power to the protected enclosure is initially off and the air supply (purging gas) to the inlet line is turned on Before operating the system, the enclosure protection vent 14 and enclosure seal are carefully inspected. Filter/regulator 246 is set to maintain a selected inlet pressure, e.g., 50 psig. Enclosure protection control valve 239 is opened slowly until a safe pressure of 0.25 in. registers on gauge 241. This is the operating pressure for the system The system is maintained at the 0.25 in. by valve 239. After observing that the 0.25 in. pressure is being maintained, then the knob for rapid exchange control valve 242 is opened by counterclockwise rotation to apply the full inlet pressure, e.g., 50 psig., to the system for a selected time based on the size of the system. A rapid exchange time on small systems may be 1.0 min. per cubic foot while very large systems may be timed at 1.0 min. for two or three cubic feet.

While the rapid exchange valve 242 is open, there is a rapid flow of purging gas (compressed air) through enclosure 11 and out through enclosure protection vent 14. After the selected time, valve 242 is closed The system will then drop in pressure to the 0.25 in. maintained by valve 239. After observing that the 0.25 in. pressure is being maintained, the power to the apparatus in the protected enclosure 11 may be turned on.

DESCRIPTION OF A SIXTH PREFERRED EMBODIMENT

Figure 22:
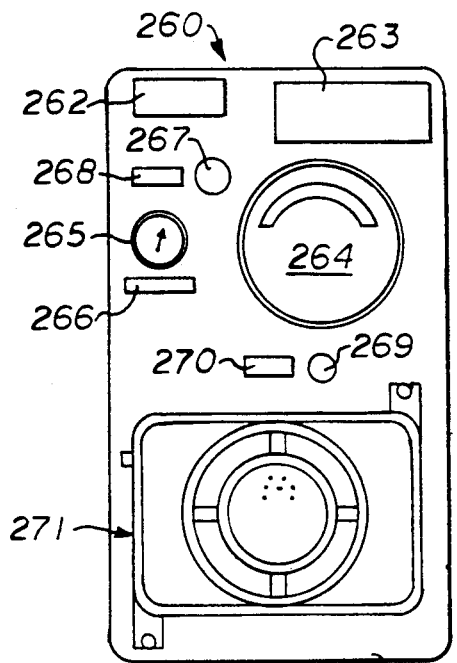
FIG. 22 is a front elevation of the control panel and apparatus thereon, substantially FIG. 4 and 5, without the solenoid valve, for Type X pressurization or purging.
Figure 23:
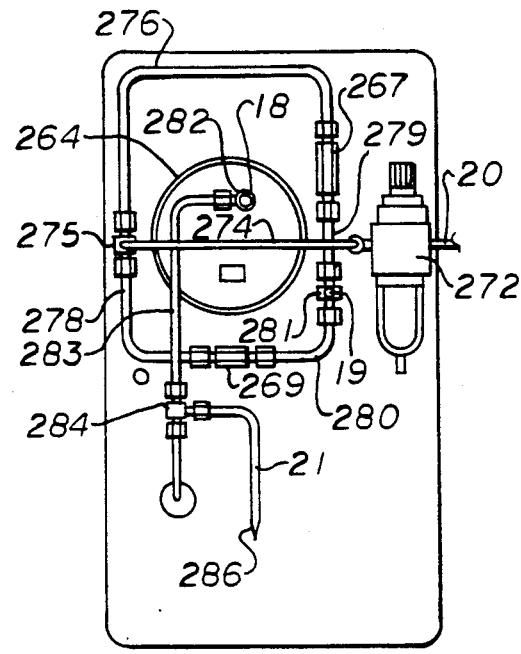
FIG. 23 is a rear elevation of the control panel shown in FIG. 22 showing the control components and piping.

Referring to the drawings by numerals of reference, there is shown in FIG. 1 and FIGS. 22-23 another enclosure control system or apparatus 10 for Type X purging. Protected enclosure 11 contains electrical apparatus (not shown) which is to be protected from flammable gases or vapors. Enclosure 1 has a name plate 12 advising that the enclosure is protected and not to be operated unless the control system 10 is in proper operation. At the top of enclosure 11, an exhaust or vent pipe 13 connected to enclosure protection vent 14. Vent 14 is preferably a Bebco EPV series 1-5 vent valve assembly having a flap valve which opens at low pressure. Vent 14 is preferably a Bebco EPV series 1-5 vent valve assembly having a flap valve which opens at low pressure, as shown in FIG. 15 and described above.

A purge control apparatus 260 is substituted in the system shown in FIG. 1 and is connected respectively to the source of purging gas and to exhaust via a venturi outlet. Purge control apparatus 260 comprises supporting panel 261 on which the various components are supported. At the top of panel 261 there is a name plate 262 identifying the type of control. An instruction plate 263 sets forth the sequence of operation.

At the upper right, there is an enclosure pressure indicator gauge 264 with rapid exchange pressure gauge 265 and name plate 266 for the rapid exchange pressure gauge supported adjacent thereto. Enclosure pressure indicator gauge 264 is preferably a Dwyer series 2000 Magnahellic gauge designed for measuring air or gas pressure in the range from 0–1.0 in. of water (see U.S. Pat. Nos. 3,397,319; 3,862,416; 4,011,759; and 4,347,744). Rapid exchange pressure gauge 265 is preferably a NOSHOK gauge measuring inlet pressures up to 100 p.s.i. or more.

The handle for a rapid exchange pressure valve 267 and its name plate 268 are positioned just above rapid exchange pressure gauge 264. The handle for enclosure pressure control valve 269 and its name plate 270 are positioned just below enclosure pressure indicator gauge 265. An explosion-proof electrical power control unit 271 is located at the bottom of panel 261. Details of control unit 271 are shown in FIGS. 6–9 with minor obvious modifications to conform to the omissionOn of the solenoid control valve. The piping for the various valves and gauges is seen on the rear of the panel 261 shown in FIG. 23.

A combination filter/regulator 272, preferably a Watts B55 Integral Filter/Regulator, is mounted on the back of panel 261 behind gauge 265 and is connected to the gauge to measure inlet pressure from the source of purge gas. Inlet line 20 from the source of purge gas is connected to an opening in the side of filter/regulator 272. The outlet from filter/regulator 272 is connected by tubing 274 to tee 275. One side of tee 275 is connected by tubing 276 to the inlet side of rapid exchange valve 267 and the other side is connected by tubing 278 to the inlet to enclosure pressure control valve 269. Valves 269 and 267 are therefore connected in parallel. Valve 267 is a manual valve operated by a handle as shown. Valve 269 is preferably a Parker needle valve.

The outlet from valve 267 is connected by tubing 279 and the outlet from valve 269 by tubing 280 to opposite sides of a tee 281. The tee 281 is connected to tubing 19 extending to protected enclosure 11. Return tubing 18 from protected enclosure 11 is connected to tee 282 connected in the back of gauge 264. The other side of tee 282 is connected by tubing 283 to tee 284. The other side of tee 284 is connected to electric power control unit 271 and is vented through outlet tubing 21 having a crimped portion forming venturi outlet 286 for controlled leakage of purging gas from the system. Electric conduit is connected to the electric power control unit 271 details of which are shown in FIGS. 6-9 and described more fully above. Control unit 271 is essentially control unit 60 modified to operate without the solenoid valve 66.

OPERATION

The system requires a source of clean, instrument quality, compressed air containing no more than trace amounts of flammable vapors or gases, and carefully regulated to a pressure in the range from 80 to 100 psi. If a compressor is utilized, it must have its intake in a nonhazardous area. Inert gas supply (compressed air) must originate from a dedicated, instrument-quality, compressed air header (½" pipe or larger) no more than 20 feet from the protection system. The control unit 271 power source must originate from a circuit breaker or fused disconnect which is suitable for the hazardous area in which it is installed. Source should be uninterrupted and within 50 ft. of the protection system.

In setting up the system, the following procedure is followed. First, ensure that the enclosed pressure control valve is fully closed. Then connect the inert gas (compressed air) supply and set the rapid exchange injection system to 60 psi. minimum by adjusting the filter/regulator. A test gauge or manometer is then connected to the enclosure for measurement of 0-5 in. (water) pressure. Check the operation of enclosure protection vent valves carefully. Open the enclosure protection valve slowly and set enclosure protection indicator to a "safe" 0.25 in. Open the rapid exchange valve to check that the vent valves open. Readjust the filter/regulator 272 to 60 psi. maximum while inducing rapid exchange flow through valve 267 until the test gauge reads 2-3 in. and does not fluctuate. Then close enclosure pressure control valve. The electronic control unit is semi-automatic and operates substantially as described for FIGS. 7 & 8 except that the automatic solenoid control valve 66 is omitted. In this embodiment, the LEDS 161-167 are for the functions (161) pressure loss alarm, (162) enclosure power off, (163) safe pressure detected, (164) exchange timer activated, (165) rapid exchange detected, (166) enclosure power on, and (167) control unit bypassed.

DESCRIPTION OF A SEVENTH PREFERRED EMBODIMENT

Figure 24:
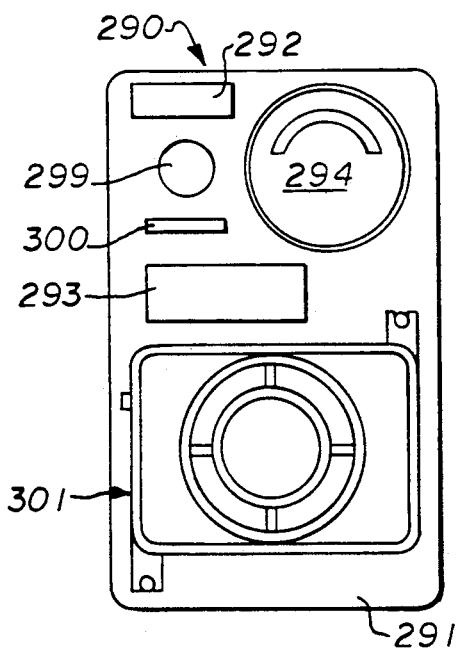
FIG. 24 is a front elevation of the control panel and apparatus thereon, substantially FIG. 22 without the rapid exchange feature, for Type X pressurization or purging.
Figure 25:
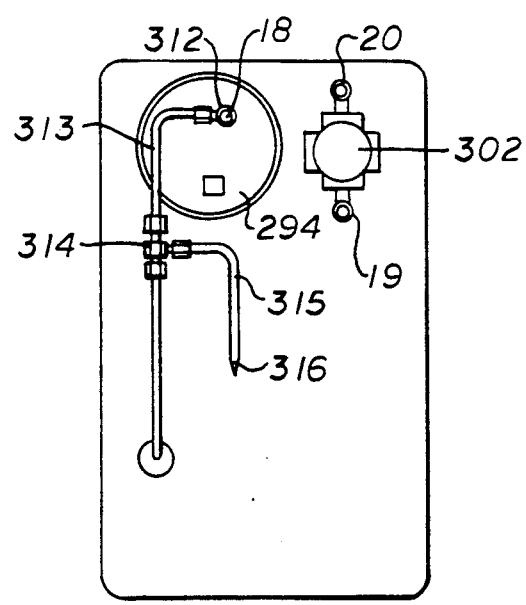
FIG. 25 is a rear elevation of the control panel shown in FIG. 24 showing the control components and piping.

Referring to the drawings by numerals of reference, there is shown in FIG. 1 and FIGS. 24-25 another enclosure control system or apparatus 10 for Type X purging. Protected enclosure 11 contains electrical apparatus (not shown) which is to be protected from flammable gases or vapors. Enclosure 11 has a name plate 12 advising that the enclosure is protected and not to be operated unless the control system 10 is in proper operation. At the top of enclosure 11, an exhaust or vent pipe 13 connected to enclosure protection vent 14. Vent 14 is preferably a Bebco EPV series 1-5 vent valve assembly having a flap valve which opens at low pressure Vent 14 is preferably a Bebco EPV series 1-5 vent valve assembly having a flap valve which opens at low pressure, as shown in FIG. 15 and described above.

A purge control apparatus 290 is substituted in the substituted in the system shown in FIG. 1 and is connected respectively to the source of purging gas and to exhaust via a venturi outlet. Purge control apparatus 290 comprises supporting panel 291 on which the various components are supported. At the top of panel 291 there is a name plate 292 identifying the type of control An instruction plate 293 sets forth the sequence of operation.

At the upper right, there is an enclosure pressure indicator gauge 294. This embodiment omits the rapid exchange function and associated apparatus. Enclosure pressure indicator gauge 264 is preferably a Dwyer series 2000 Magnahellic gauge designed for measuring air or gas pressure in the range from 0-1.0 in. of water (see U.S. Pat. Nos. 3,397,319; 3,862,416; 4,011,759; and 4,347,744).

The handle for enclosure pressure control valve 299 and its name plate 300 are positioned to the left of enclosure pressure indicator gauge 294. An explosion-proof electrical power control unit 301 is located at the bottom of panel 291. Details of control unit 301 are shown in FIGS. 6-9 with minor obvious modifications to conform to the omission of the solenoid control valve and the rapid exchange function. The piping for the various valves and gauges is seen on the rear of the panel 291 shown in FIG. 25.

A regulator 302 is mounted on the back of panel 291 behind valve 299. Inlet line 20 from the source of purge gas is connected to an opening in the top of regulator 302. The outlet from regulator 302 is connected to line 19.

Return tubing 18 from protected enclosure 11 is connected to tee 312 connected in the back of gauge 294. The other side of tee 312 is connected by tubing 313 to tee 314. The other side of tee 314 is connected to electric power control unit 301 and is vented through outlet tubing 21 having a crimped portion forming venturi outlet 316 for controlled leakage of purging gas from the system. Electric conduit is connected to the electric power control unit 301 details of which are shown in FIGS. 6-9 and described more fully above. Control unit 301 is essentially control unit 60 modified to operate without the solenoid valve 66 and the rapid exchange function. In this embodiment, the LEDS 161-167 are for the functions (161) pressure loss alarm, (162) enclosure power off, (163) safe pressure detected, (164) exchange timer activated, (165) rapid exchange detected (used only where apparatus is used in Class 1 areas), (166) enclosure power on, and (167) control unit bypassed.

OPERATION

The system requires a source of clean, instrument-quality, compressed air containing no more than trace amounts of flammable vapors or gases, and carefully regulated to a pressure in the range from 80 to 100 psi If a compressor is utilized, it must have its intake in a nonhazardous area. Inert gas supply (compressed air) must originate from a dedicated, instrument-quality, compressed air header (½" pipe or larger) no more than 20 feet from the protection system. The control unit 301 power source must originate from a circuit breaker or fused disconnect which is suitable for the hazardous area in which it is installed. Source should be uninterrupted and within 50 ft. of the protection system In setting up the system, the following procedure is followed. First, ensure that the enclosed pressure control valve is fully closed. Then connect the inert gas (compressed air) supply Check the operation of enclosure protection vent valves (if used) carefully. Open the enclosure protection valve slowly and set enclosure protection indicator to a "safe" 0.25 in. The electronic control unit is semi-automatic and operates substantially as described for FIGS. 7 8 except that the automatic solenoid control valve 66 and rapid exchange function are omitted.

While this invention has been fully and completely described with special emphasis on two preferred embodiments, it should be understood that within the scope of the appended claims this invention may be practiced otherwise than as specifically described.

I claim:

1. A control system for purging and pressurization of electrical equipment comprising
    an enclosure in a hazardous area containing combustible gases, vapors or dusts, or in danger of containing combustible gases, vapors or dusts,
    said enclosure having electrical equipment therein endangered by said combustible gases, vapors or dusts,
    means to supply a purging or pressurizing gas to said enclosure at a first predetermined pressure,
    means for venting said enclosure at a second predetermined pressure,
    means for controlling said gas supply to maintain said first predetermined pressure comprising
    a supporting panel,
    valve means for controlling flow of said gas to said enclosure, and
    pressure indicating means responsive to pressure of said gas to indicate the pressure thereof to permit adjustment of said valve to produce said first predetermined pressure.

2. A control system for purging and pressurization of electrical equipment according to claim 1 in which
    said enclosure requires Type Z pressurization or purging.

3. A control system for purging and pressurization of electrical equipment according to claim 2 in which
    said valve means is a manually operated valve.

4. A control system for purging and pressurization of electrical equipment according to claim 2 in which
    said valve means is an automatically operated valve.

5. A control system for purging and pressurization of electrical equipment according to claim 2 including
    a pressure regulator responsive to the pressure of said gas and operable to maintain said first predetermined pressure.

6. A control system for purging and pressurization of electrical equipment according to claim 2 in which
    said valve means is a manually operated valve, and including
    a pressure regulator responsive to the pressure of said gas and operable to maintain said first predetermined pressure.

7. A control system for purging and pressurization of electrical equipment according to claim 2 in which
    said valve means is an automatically operated valve, and including
    a pressure regulator responsive to the pressure of said gas and operable to maintain said first predetermined pressure.

8. A control system for purging and pressurization of electrical equipment according to claim 2 in which
    said pressure indicating means includes an exhaust tube and venturi orifice providing constant flow past said enclosure pressure indicating means.

9. A control system for purging and pressurization of electrical equipment comprising
    an enclosure in a hazardous area containing combustible gases, vapors or dusts, or in danger of containing combustible gases, vapors or dusts,
    said enclosure having electrical equipment therein endangered by said combustible gases, vapors or dusts,
    means to supply a purging or pressurizing gas to said enclosure at a first predetermined pressure,
    means for venting said enclosure at a second predetermined pressure,
    means for controlling said gas supply to maintain said first predetermined pressure comprising
    a supporting panel with valve means for controlling flow of said gas to said enclosure,
    an automatic pressure control switch and alarm responsive to enclosure pressure operable to activate said alarm and deenergize said system and said electrical equipment on predetermined pressure loss in said enclosure, and
    pressure indicating means responsive to pressure of said gas to indicate the pressure thereof to permit adjustment of said valve to produce said first predetermined pressure.

10. A control system for purging and pressurization of electrical equipment according to claim 9 in which
    said enclosure requires Type Z pressurization or purging.

11. A control system for purging and pressurization of electrical equipment according to claim 10 in which
    said automatic pressure control switch is an explosion-proof switch.

12. A control system for purging and pressurization of electrical equipment according to claim 10 in which
    said automatic pressure control switch is an explosion-proof switch, and
    said valve means is a manually operated valve.

13. A control system for purging and pressurization of electrical equipment according to claim 10 in which
    said automatic pressure control switch is an explosion-proof switch, and
    said valve means is an automatically operated valve.

14. A control system for purging and pressurization of electrical equipment according to claim 10 in which
    said automatic pressure control switch is an explosion-proof switch, and including
    a pressure regulator responsive to the pressure of said gas and operable to maintain said first predetermined pressure.

15. A control system for purging and pressurization of electrical equipment according to claim 10 in which
    said valve means is a manually operated valve,
    said automatic pressure control switch is an explosion-proof switch, and including
    a pressure regulator responsive to the pressure of said gas and operable to maintain said first predetermined pressure.

16. A control system for purging and pressurization of electrical equipment according to claim 10 in which
    said valve means is an automatically operated valve,
    said automatic pressure control switch is an explosion-proof switch, and including a pressure regulator responsive to the pressure of said gas and operable to maintain said first predetermined pressure.

17. A control system for purging and pressurization of electrical equipment according to claim 10 in which
said pressure indicating means includes an exhaust tube and venturi orifice providing constant flow past said enclosure pressure indicating means.

18. A control system for purging and pressurization of electrical equipment comprising
an enclosure in a hazardous area containing combustible gases, vapors or dusts, or in danger of containing combustible gases, vapors or dusts,
said enclosure having electrical equipment therein endangered by said combustible gases, vapors or dusts,
means to supply a purging or pressurizing gas to said enclosure at a first predetermined pressure,
means for venting said enclosure at a second predetermined pressure,
means for controlling said gas supply to maintain said first predetermined pressure comprising
a supporting panel,
rapid exchange valve means for controlling flow of said gas for rapid exchange of gas in said enclosure,
pressure indicating means responsive to pressure of said gas to indicate the pressure thereof to regulate pressure during permit the rapid exchange function,
valve means for controlling flow of said gas to said enclosure for pressurization or purging, and
pressure indicating means responsive to pressure of said gas to indicate the pressure thereof to permit adjustment of said valve to produce said first predetermined pressure.

19. A control system for purging and pressurization of electrical equipment according to claim 18 in which
said enclosure requires Type Z pressurization or purging.

20. A control system for purging and pressurization of electrical equipment according to claim 19 in which
said valve means is a manually operated valve.

21. A control system for purging and pressurization of electrical equipment according to claim 19 in which
said valve means is an automatically operated valve.

22. A control system for purging and pressurization of electrical equipment according to claim 19 including
a pressure regulator responsive to the pressure of said gas and operable to maintain said first predetermined pressure.

23. A control system for purging and pressurization of electrical equipment according to claim 19 in which
said valve means is a manually operated valve, and including
a pressure regulator responsive to the pressure of said gas and operable to maintain said first predetermined pressure.

24. A control system for purging and pressurization of electrical equipment according to claim 19 in which
said valve means is an automatically operated valve, and including
a pressure regulator responsive to the pressure of said gas and operable to maintain said first predetermined pressure.

25. A control system for purging and pressurization of electrical equipment according to claim 19 in which
said pressure indicating means includes an exhaust tube and venturi orifice providing constant flow past said enclosure pressure indicating means.

26. A control system for purging and pressurization of electrical equipment comprising
an enclosure in a hazardous area containing combustible gases, vapors or dusts, or in danger of containing combustible gases, vapors or dusts,
said enclosure having electrical equipment therein endangered by said combustible gases, vapors or dusts,
means to supply a purging or pressurizing gas to said enclosure at a first predetermined pressure,
means for venting said enclosure at a second predetermined pressure,
means for controlling said gas supply to maintain said first predetermined pressure comprising
a supporting panel,
rapid exchange valve means for controlling flow of said gas for rapid exchange of gas in said enclosure,
pressure indicating means responsive to pressure of said gas to indicate the pressure thereof to regulate pressure during permit the rapid exchange function,
valve means for controlling flow of said gas to said enclosure for pressurization or purging,
pressure indicating means responsive to pressure of said gas to indicate the pressure thereof to permit adjustment of said valve to produce said first predetermined pressure, and
an automatic pressure control switch and alarm responsive to enclosure pressure operable to activate said alarm and deenergize said system and said electrical equipment on predetermined pressure loss in said enclosure.

27. A control system for purging and pressurization of electrical equipment according to claim 26 in which
said enclosure requires Type Y pressurization or purging.

28. A control system for purging and pressurization of electrical equipment according to claim 27 in which
said automatic pressure control switch is an explosion-proof switch.

29. A control system for purging and pressurization of electrical equipment according to claim 27 in which
said valve means is a manually operated valve.

30. A control system for purging and pressurization of electrical equipment according to claim 27 in which
said valve means is an automatically operated valve.

31. A control system for purging and pressurization of electrical equipment according to claim 27 including
a pressure regulator responsive to the pressure of said gas and operable to maintain said first predetermined pressure.

32. A control system for purging and pressurization of electrical equipment according to claim 27 in which
said valve means is a manually operated valve, and including
a pressure regulator responsive to the pressure of said gas and operable to maintain said first predetermined pressure.

33. A control system for purging and pressurization of electrical equipment according to claim 27 in which
said valve means is an automatically operated valve, and including
a pressure regulator responsive to the pressure of said gas and operable to maintain said first predetermined pressure.

34. A control system for purging and pressurization of electrical equipment according to claim 26 in which said system includes
indicator to measure enclosure pressure,
a filter/regulator to preset rapid exchange pressure and flow rate of the purging gas to said electrical enclosure,
a rapid exchange pressure gauge,
an enclosure pressure valve for adjustment of the enclosed pressure,
a rapid exchange control valve for rapid exchange of purging gas to the electrical enclosure during startup, and
a venturi providing constant flow past said enclosure indicator.

35. A control system for purging and pressurization of electrical equipment comprising
an enclosure in a hazardous area containing combustible gases, vapors or dusts, or in danger of containing combustible gases, vapors or dusts,
said enclosure having electrical equipment therein endangered by said combustible gases, vapors or dusts,
means to supply a purging or pressurizing gas to said enclosure at a first predetermined pressure,
means for venting said enclosure at a second predetermined pressure,
automatic means for controlling said gas supply to maintain said first predetermined pressure comprising
a supporting panel,
rapid exchange solenoid valve means for controlling flow of said gas for rapid exchange of gas in said enclosure,
pressure indicating means responsive to pressure of said gas to indicate the pressure thereof to regulate pressure during permit the rapid exchange function,
automatic valve means for controlling flow of said gas to said enclosure for pressurization or purging,
pressure indicating means responsive to pressure of said gas to indicate the pressure thereof to permit adjustment of said valve to produce said first predetermined pressure,
an electronic control unit including
timing means controlling said solenoid valve means, and
an automatic pressure control switch and alarm responsive to enclosure pressure operable to activate said alarm and deenergize said system and said electrical equipment on predetermined pressure loss in said enclosure.

36. A control system for purging and pressurization of electrical equipment according to claim 35 in which
said enclosure requires Type X pressurization or purging, including
a vent control valve and an automatic inlet valve providing for rapid exchange of purging gas to said electrical enclosure during start up.

37. A control system for purging and pressurization of electrical equipment according to claim 35 including
a spark arresting element,
said vent control valve being operable to open at low pressure for venting of rapid exchange purging gases from said electrical enclosure, and for the venting of over pressurization resulting regulator failure or operator error while preventing the escape of any sparks resulting from failure of electrical equipment, and
a mounting hub and a rain-proof cap to mount and protect said vent control valve and spark arresting element.

38. A control system for purging and pressurization of electrical equipment according to claim 36 in which
said automatic pressure control switch is an explosion-proof switch.

39. A control system for purging and pressurization of electrical equipment according to claim 36 in which
said automatically operated valve means includes a manual control valve.

40. A control system for purging and pressurization of electrical equipment according to claim 36 including
a pressure regulator responsive to the pressure of said gas and operable to maintain said first predetermined pressure.

41. A control system for purging and pressurization of electrical equipment according to claim 36 in which
said automatically operated valve means includes a manual control valve, and further including
a pressure regulator responsive to the pressure of said gas and operable to maintain said first predetermined pressure.

42. A control system for purging and pressurization of electrical equipment according to claim 36 in which
said pressure indicating means includes an exhaust tube and venturi orifice providing constant flow past said enclosure pressure indicating means.

43. A control system for purging and pressurization of electrical equipment according to claim 36 in which
said system provides purging and rapid exchange of said enclosure, and includes
an indicator to measure enclosure pressure,
a filter/regulator to preset the rapid exchange pressure and flow rate of the purging gas to said electrical enclosure,
a rapid exchange pressure gauge,
an enclosure pressure valve for adjustment of the enclosed pressure,
a manual rapid exchange control valve for rapid exchange of purging gas to the electrical enclosure during startup, and
a venturi providing constant flow past the enclosure indicator and an electronic power control unit for control of power to the enclosure.

44. A control system for purging and pressurization of electrical equipment according to claim 36 in which
said system provides purging and rapid exchange of said enclosure, and includes
an indicator to measure enclosure pressure,
a filter/regulator to preset the rapid exchange pressure and flow rate of the purging gas to said electrical enclosure,
a rapid exchange pressure gauge,
an enclosure pressure valve for adjustment of the enclosed pressure,
a manual rapid exchange control valve for rapid exchange of purging gas to the electrical enclosure during startup,
a venturi providing constant flow past the enclosure indicator, and
an electronic power control unit for control of power to the enclosure.

45. A control system for purging and pressurization of electrical equipment according to claim 36 in which said system provides purging and rapid exchange of said enclosure, and includes an indicator to measure enclosure pressure, a filter/regulator to preset the rapid exchange pressure and flow rate of the purging gas to said electrical enclosure, a rapid exchange pressure gauge, an enclosure pressure valve for adjustment of the enclosed pressure, a semi-automatic rapid exchange control valve for rapid exchange of purging gas to the electrical enclosure during start-up, a venturi providing constant flow past the enclosure indicator, and an electronic power control unit for control of power to the enclosure.

46. A control system for purging and pressurization of electrical equipment according to claim 36 in which said system provides purging and rapid exchange of said enclosure, and includes an indicator to measure enclosure pressure, a filter/regulator to preset the rapid exchange pressure and flow rate of the purging gas to said electrical enclosure, a rapid exchange pressure gauge, an enclosure pressure valve for adjustment of the enclosed pressure, an automatic rapid exchange control valve for rapid exchange of purging gas to the electrical enclosure during startup, a venturi providing constant flow past the enclosure indicator, and an electronic power control unit for control of power to the enclosure.

47. A control system for purging and pressurization of electrical equipment comprising an enclosure in a hazardous area containing combustible gases, vapors or dusts, or in danger of containing combustible gases, vapors or dusts, said enclosure having electrical equipment therein endangered by said combustible gases, vapors or dusts requiring Type X pressurization or purging, means to supply a purging or pressurizing gas to said enclosure at a first predetermined pressure, means for venting said enclosure at a second predetermined pressure, automatic means for controlling said gas supply to maintain said first predetermined pressure comprising a supporting panel, rapid exchange valve means for controlling flow of said gas for rapid exchange of gas in said enclosure, pressure indicating means responsive to pressure of said gas to indicate the pressure thereof to regulate pressure during permit the rapid exchange function, automatic valve means for controlling flow of said gas to said enclosure for pressurization or purging, pressure indicating means responsive to pressure of said gas to indicate the pressure thereof to permit adjustment of said valve to produce said first predetermined pressure, an electronic control unit including timing means controlling said valve means, and an automatic pressure control switch and alarm responsive to enclosure pressure operable to activate said alarm and deenergize said system and said electrical equipment on predetermined pressure loss in said enclosure.

48. A control system for purging and pressurization of electrical equipment comprising an enclosure in a hazardous area containing combustible gases, vapors or dusts, or in danger of containing combustible gases, vapors or dusts, said enclosure having electrical equipment therein endangered by said combustible gases, vapors or dusts requiring Type X pressurization or purging, means to supply a purging or pressurizing gas to said enclosure at a first predetermined pressure, means for venting said enclosure at a second predetermined pressure, automatic means for controlling said gas supply to maintain said first predetermined pressure comprising a supporting panel, pressure indicating means responsive to pressure of said gas to indicate the pressure thereof to regulate pressure during permit the rapid exchange function, automatic valve means for controlling flow of said gas to said enclosure for pressurization or purging, pressure indicating means responsive to pressure of said gas to indicate the pressure thereof to permit adjustment of said valve to produce said first predetermined pressure, an electronic control unit including timing means controlling said valve means, and an automatic pressure control switch and alarm responsive to enclosure pressure operable to activate said alarm and deenergize said system and said electrical equipment on predetermined pressure loss in said enclosure.

49. A control system for purging and pressurization of electrical equipment comprising an enclosure in a hazardous area containing combustible gases, vapors or dusts, or in danger of containing combustible gases, vapors or dusts, said enclosure having electrical equipment therein endangered by said combustible gases, vapors or dusts, said control system comprising means to supply a purging or pressurizing gas to said enclosure at a predetermined pressure, adjustable regulating means including a manual operator and pipe fittings providing safe connections, means for controlling said gas supply to maintain said predetermined pressure, means rendering said gas supply tamper proof to prevent unauthorized adjustment of said predetermined pressure, means providing fail-safe, downstream, differential pressure indication responsive to enclosure pressure to indicate pressure to permit adjustment of said valve to predetermine said pressure, piping connections to said enclosure from said system, means to provide continuous flow of purging and pressurizing gas through said system past said pressure indication means to an atmospheric vent to prevent gas from being trapped therein, means to control continuous flow of purging and pressurizing gas through said system past said pressure indication means to vary the flow rate through said system and venting gas to atmosphere, means providing color coded indication of said predetermined pressure wherein selected colors indicate low, safe and high pressures, respectively and including means to indicate enclosure pressure in inches of water, and a supporting panel supporting said pressure indicating and pressure control means and having indicia for indicating the mode of use and the necessity for use of the system to meet safety requirements.

50. A control apparatus for a system for purging and pressurization of electrical equipment including an enclosure in a hazardous area containing combustible gases, vapors or dusts, or in danger of containing combustible gases, vapors or dusts, said enclosure having electrical equipment therein endangered by said combustible gases, vapors or dusts, means to supply a purging or pressurizing gas to said enclosure at a first predetermined pressure, means for venting said enclosure at a second predetermined pressure, said apparatus comprising means for controlling said gas supply to maintain said first predetermined pressure comprising a supporting panel, rapid exchange valve means for controlling flow of said gas for rapid exchange of gas in said enclosure, pressure indicating means responsive to pressure of said gas to indicate the pressure thereof to regulate pressure during permit the rapid exchange function, valve means for controlling flow of said gas to said enclosure for pressurization or purging, pressure indicating means responsive to pressure of said gas to indicate the pressure thereof to permit adjustment of said valve to produce said first predetermined pressure, and an automatic pressure control switch and alarm responsive to enclosure pressure operable to activate said alarm and deenergize said system and said electrical equipment on predetermined pressure loss in said enclosure.

51. A control apparatus according to claim 50 in which said enclosure requires Type Y pressurization or purging.

52. A control apparatus according to claim 51 in which said automatic pressure control switch is an explosion-proof switch.

53. A control apparatus according to claim 51 in which said valve means is a manually operated valve.

54. A control apparatus according to claim 51 in which said valve means is an automatically operated valve.

55. A control apparatus according to claim 51 including a pressure regulator responsive to the pressure of said gas and operable to maintain said first predetermined pressure.

56. A control apparatus according to claim 51 in which said valve means is a manually operated valve, and including a pressure regulator responsive to the pressure of said gas and operable to maintain said first predetermined pressure.

57. A control apparatus according to claim 51 in which said valve means is an automatically operated valve, and including a pressure regulator responsive to the pressure of said gas and operable to maintain said first predetermined pressure.

58. A control apparatus according to claim 51 in which said system includes indicator to measure enclosure pressure, a filter/regulator to preset rapid exchange pressure and flow rate of the purging gas to said electrical enclosure, a rapid exchange pressure gauge, an enclosure pressure valve for adjustment of the enclosed pressure, a rapid exchange control valve for rapid exchange of purging gas to the electrical enclosure during start-up, and a venturi providing constant flow past said enclosure indicator.

59. A control apparatus for a system for purging and pressurization of electrical equipment comprising an enclosure in a hazardous area containing combustible gases, vapors or dusts, or in danger of containing combustible gases, vapors or dusts, said enclosure having electrical equipment therein endangered by said combustible gases, vapors or dusts, means to supply a purging or pressurizing gas to said enclosure at a first predetermined pressure, means for venting said enclosure at a second predetermined pressure, said apparatus comprising automatic means for controlling said gas supply to maintain said first predetermined pressure comprising a supporting panel, rapid exchange solenoid valve means for controlling flow of said gas for rapid exchange of gas in said enclosure, pressure indicating means responsive to pressure of said gas to indicate the pressure thereof to regulate pressure during permit the rapid exchange function, automatic valve means for controlling flow of said gas to said enclosure for pressurization or purging, pressure indicating means responsive to pressure of said gas to indicate the pressure thereof to permit adjustment of said valve to produce said first predetermined pressure, an electronic control unit including timing means controlling said solenoid valve means, and an automatic pressure control switch and alarm responsive to enclosure pressure operable to activate said alarm and deenergize said system and said electrical equipment on predetermined pressure loss in said enclosure.

60. A control apparatus according to claim 59 in which said enclosure requires Type X pressurization or purging, including a vent control valve and an automatic inlet valve providing for rapid exchange of purging gas to said electrical enclosure during start up.

61. A control apparatus according to claim 59 in which
- a spark arresting element,
- said vent control valve being operable to open at low pressure for venting of rapid exchange purging gases from said electrical enclosure, and for the venting of over pressurization resulting regulator failure or operator error while preventing the escape of any sparks resulting from failure of electrical equipment, and
- a mounting hub and a rain-proof cap to mount and protect said vent control valve and spark arresting element.

62. A control apparatus according to claim 59 in which
- said automatic pressure control switch is an explosion-proof switch.

63. A control apparatus according to claim 59 in which
- said automatically operated valve means includes a manual control valve.

64. A control apparatus according to claim 59 including
- a pressure regulator responsive to the pressure of said gas and operable to maintain said first predetermined pressure.

65. A control apparatus according to claim 59 in which
- said automatically operated valve means includes a manual control valve, and further including
- a pressure regulator responsive to the pressure of said gas and operable to maintain said first predetermined pressure.

66. A control apparatus according to claim 59 in which
- said pressure indicating means includes an exhaust tube and venturi orifice providing constant flow past said enclosure pressure indicating means.

67. A control apparatus according to claim 59 in which
- said system provides purging and rapid exchange of said enclosure, and includes
- an indicator to measure enclosure pressure,
- a filter/regulator to preset the rapid exchange pressure and flow rate of the purging gas to said electrical enclosure,
- a rapid exchange pressure gauge,
- an enclosure pressure valve for adjustment of the enclosed pressure,
- a manual rapid exchange control valve for rapid exchange of purging gas to the electrical enclosure during startup, and
- a venturi providing constant flow past the enclosure indicator and an electronic power control unit for control of power to the enclosure.

68. A control apparatus according to claim 59 in which
- said system provides purging and rapid exchange of said enclosure, and includes
- an indicator to measure enclosure pressure,
- a filter/regulator to preset the rapid exchange pressure and flow rate of the purging gas to said electrical enclosure,
- a rapid exchange pressure gauge,
- an enclosure pressure valve for adjustment of the enclosed pressure,
- a manual rapid exchange control valve for rapid exchange of purging gas to the electrical enclosure during startup,
- a venturi providing constant flow past the enclosure indicator, and
- an electronic power control unit for control of power to the enclosure.

69. A control apparatus according to claim 59 in which
- said system provides purging and rapid exchange of said enclosure, and includes
- an indicator to measure enclosure pressure,
- a filter/regulator to preset the rapid exchange pressure and flow rate of the purging gas to said electrical enclosure,
- a rapid exchange pressure gauge,
- an enclosure pressure valve for adjustment of the enclosed pressure,
- a semi-automatic rapid exchange control valve for rapid exchange of purging gas to the electrical enclosure during start-up,
- a venturi providing constant flow past the enclosure indicator, and
- an electronic power control unit for control of power to the enclosure.

70. A control apparatus according to claim 59 in which
- said system provides purging and rapid exchange of said enclosure, and includes
- an indicator to measure enclosure pressure,
- a filter/regulator to preset the rapid exchange pressure and flow rate of the purging gas to said electrical enclosure,
- a rapid exchange pressure gauge,
- an enclosure pressure valve for adjustment of the enclosed pressure,
- an automatic rapid exchange control valve for rapid exchange of purging gas to the electrical enclosure during startup,
- a venturi providing constant flow past the enclosure indicator, and
- an electronic power control unit for control of power to the enclosure.

71. A control apparatus for a system for purging and pressurization of electrical equipment comprising
- an enclosure in a hazardous area containing combustible gases, vapors or dusts, or in danger of containing combustible gases, vapors or dusts,
- said enclosure having electrical equipment therein endangered by said combustible gases, vapors or dusts requiring Type X pressurization or purging,
- means to supply a purging or pressurizing gas to said enclosure at a first predetermined pressure,
- means for venting said enclosure at a second predetermined pressure,
- said apparatus comprising
- automatic means for controlling said gas supply to maintain said first predetermined pressure comprising
- a supporting panel,
- rapid exchange valve means for controlling flow of said gas for rapid exchange of gas in said enclosure,
- pressure indicating means responsive to pressure of said gas to indicate the pressure thereof to regulate pressure during permit the rapid exchange function,
- automatic valve means for controlling flow of said gas to said enclosure for pressurization or purging, pressure indicating means responsive to pressure of said gas to indicate the pressure thereof to permit adjustment of said valve to produce said first predetermined pressure, an electronic control unit including timing means controlling said valve means, and an automatic pressure control switch and alarm responsive to enclosure pressure operable to active said alarm and deenergize said system and said electrical equipment on predetermined pressure loss in said enclosure.

72. A control apparatus for a system for purging and pressurization of electrical equipment comprising an enclosure in a hazardous area containing combustible gases, vapors or dusts, or in danger of containing combustible gases, vapors or dusts, said enclosure having electrical equipment therein endangered by said combustible gases, vapors or dusts requiring Type X pressurization or purging, means to supply a purging or pressurizing gas to said enclosure at a first predetermined pressure, means for venting said enclosure at a second predetermined pressure, said apparatus comprising automatic means for controlling said gas supply to maintain said first predetermined pressure comprising a supporting panel, pressure indicating means responsive to pressure of said gas to indicate the pressure thereof to regulate pressure during permit the rapid exchange function, automatic valve means for controlling flow of said gas to said enclosure for pressurization or purging, pressure indicating means responsive to pressure of said gas to indicate the pressure thereof to permit adjustment of said valve to produce said first predetermined pressure, an electronic control unit including timing means controlling said valve means, and an automatic pressure control switch and alarm responsive to enclosure pressure operable to activate said alarm and deenergize said system and said electrical equipment on predetermined pressure loss in said enclosure.

73. A control apparatus for a system for purging and pressurization of electrical equipment comprising an enclosure in a hazardous area containing combustible gases, vapors or dusts, or in danger of containing combustible gases, vapors or dusts, said enclosure having electrical equipment therein endangered by said combustible gases, vapors or dusts, said control system comprising means to supply a purging or pressurizing gas to said enclosure at a predetermined pressure, adjustable regulating means including a manual operator and pipe fittings providing safe connections, said apparatus comprising means for controlling said gas supply to maintain said predetermined pressure, means rendering said gas supply tamper proof to prevent unauthorized adjustment of said predetermined pressure, means providing fail-safe, downstream, differential pressure indication responsive to enclosure pressure to indicate pressure to permit adjustment of said valve to predetermine said pressure, piping connections to said enclosure from said system, means to provide continuous flow of purging and pressurizing gas through said system past said pressure indication means to an atmospheric vent to prevent gas from being trapped therein, means to control continuous flow of purging and pressurizing gas through said system past said pressure indication means to vary the flow rate through said system and venting gas to atmosphere, means providing color coded indication of said predetermined pressure wherein selected colors indicate low, safe and high pressures, respectively and including means to indicate enclosure pressure in inches of water, and a supporting panel supporting said pressure indicating and pressure control means and having indicia for indicating the mode of use and the necessity for use of the system to meet safety requirements.

* * * * *